United States Patent [19]

Bono

[11] Patent Number: 5,127,094
[45] Date of Patent: Jun. 30, 1992

[54] VIRTUAL STORAGE TYPE COMPUTER SYSTEM

[75] Inventor: Yoshimitsu Bono, Osaka, Japan

[73] Assignee: Hitachi, Ltd., Tokyo, Japan

[21] Appl. No.: 268,267

[22] Filed: Nov. 7, 1988

[30] Foreign Application Priority Data

Nov. 9, 1987 [JP] Japan .................................. 62-280912
Mar. 18, 1988 [JP] Japan .................................. 63-66317

[51] Int. Cl.$^5$ ............................................. G06F 12/08
[52] U.S. Cl. .................................... 395/400; 395/425;
364/243; 364/243.2; 364/256.3; 364/241.9
[58] Field of Search ... 364/200 MS File, 900 MS File

[56] References Cited

U.S. PATENT DOCUMENTS

| | | | |
|---|---|---|---|
| 4,173,783 | 11/1979 | Couleur et al. | 364/200 |
| 4,231,088 | 10/1980 | Hammer et al. | 364/200 |
| 4,272,819 | 6/1981 | Katsumata et al. | 364/200 |
| 4,408,273 | 10/1983 | Plow | 364/200 |
| 4,459,661 | 7/1984 | Kaneda et al. | 364/200 |

FOREIGN PATENT DOCUMENTS 0214870 3/1987 European Pat. Off.
0230354 7/1987 European Pat. Off.

OTHER PUBLICATIONS

*An Introduction to Operating Systems*, H. M. Deitel, copyright 1983, pp. 179–190.
*Operating Systems*, H. Lorin and H. M. Deitel, copyright 1981, pp. 299–305.
Patent Abstracts of Japan, vol. 11, No. 37 (P-543) [2484]Feb. 4, 1978; & JP-A-61 206 042 (Hitachi Ltd), Dec. 9, 1986.

Primary Examiner—Gareth D. Shaw
Assistant Examiner—Paul Kulik
Attorney, Agent, or Firm—Antonelli, Terry Stout & Kraus

[57] ABSTRACT

A computer system includes a processing unit and an external storage holding a virtual data set including an address translation table in addition to data and program. The processing unit includes a real storage for holding an address translation table transferred from the external storage when the virtual data set is opened and an address translation mechanism for making access to the real storage by translating the virtual address to the real address with the aid of the address translation table. When the data required by the processing unit is absent on the real storage, the processing unit transfers the virtual address to the external storage and holds the data transferred from the external storage on the real storage.

17 Claims, 17 Drawing Sheets

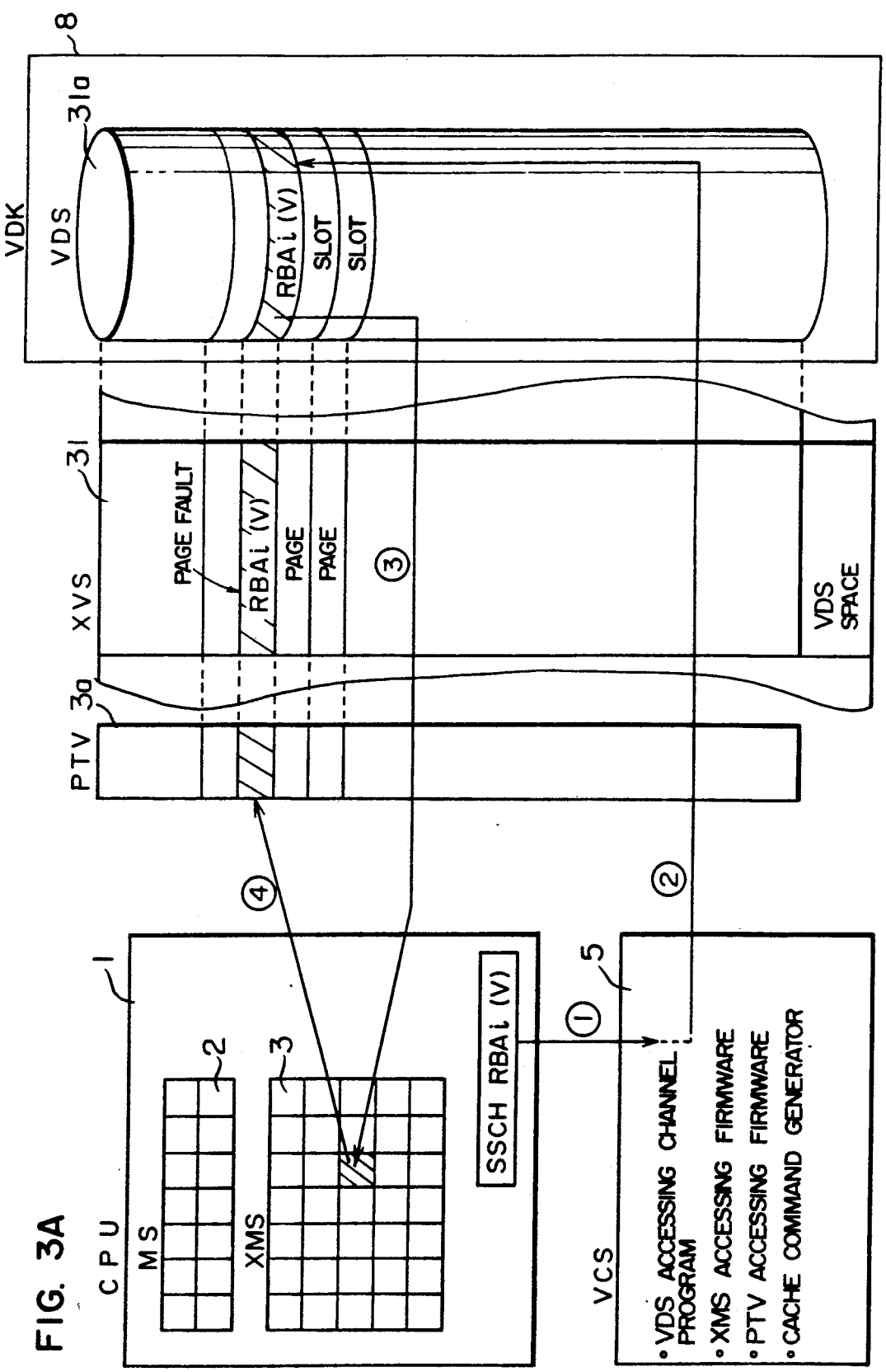

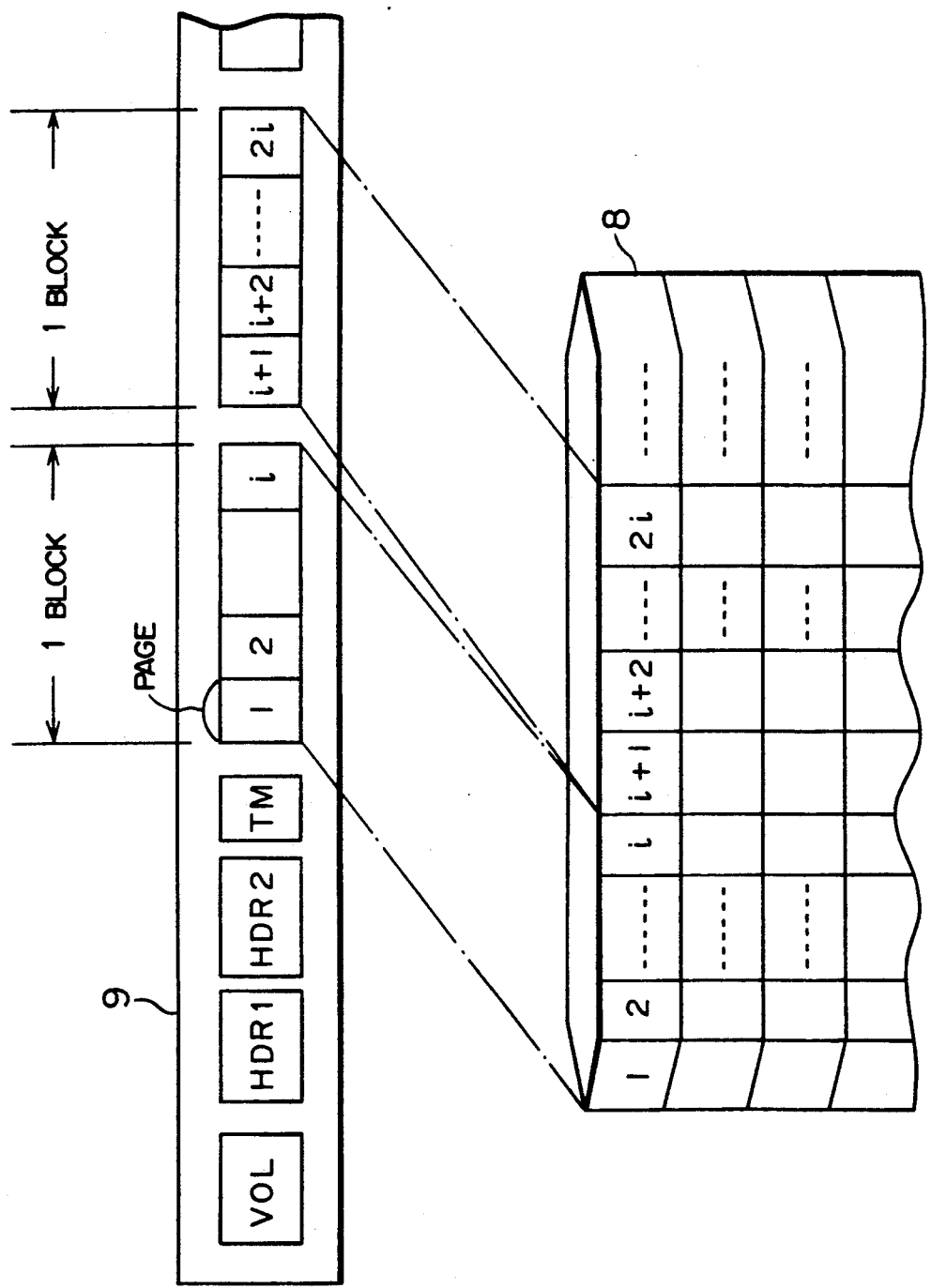

VIRTUAL STORAGE TYPE COMPUTER SYSTEM

BACKGROUND OF THE INVENTION

The present invention generally relates to a computer system of virtual storage type. More particularly, the invention is concerned with a computer system in which data sets are resident in a virtual storage.

At present, most of the computers use a virtual storage system having a configuration in which a main storage is divided into pages so that fragmentation can be avoided in the main storage with a view to enhancing effective utilization of the main storage while increasing the apparent capacity thereof.

At the present state of the virtual storage computer system, the virtual storage is destined to hold therein only a program. There is not yet available the technique allowing data to be stored in the virtual storage in addition to the program. Consequently, upon accessing the data, it is required to make access to a disk storage unit through the medium of a channel unit by issuing an I/O (input/output) instruction. To this end, a corresponding channel program has to be made available in the main storage. The channel program and the input/ output data area are ordinarily given in terms of virtual addresses. The channel unit performs a data transaction directly with the main storage (the area indicated by the real addresses). Consequently, address translation has to be performed for the channel program and the input-/output data area (i.e. the translation of the virtual address to the real address). Further, since the input/output (I/O) operation can not be executed in case the area of concern is paged-out when the channel program and the input/output area are referenced, it becomes necessary to fix the page on which the area of concern exists (page fixation for inhibiting page-out). Additionally, the main storage is divided on a page basis. Accordingly, when the input/ output operation is to be performed over a range exceeding a page, an indirect data addressing word (IDAW) is added to the channel program, wherein the data I/O operation is performed over discrete pages through the control effectuated by utilizing the indirect data addressing word (IDAW). These operations provide a cause for increasing the overhead of an input/output supervisor. On the other hand, the channel program is prepared in dependence on the type of the disk unit or magnetic tape unit being employed. Consequently, when the disk unit or the magnetic tape unit is changed, alteration of the channel program is necessitated. Thus, when a new disk unit or magnetic tape unit is utilized, the data management and the input/output (I/O) supervisor must be changed correspondingly.

In the virtual storage system available at present, the main storage can be increased at maximum only to the capacity which can be indicated by the maximum virtual address. This means that the high capacity and inexpensiveness of the memory available due to progress in the hardware technology can not be made use of adequately. It is further noted that the prior art VIO (virtual I/O) technique is not designed to place the data set in the virtual memory unit but resides simply in replacement of the data set I/O by the paging I/O.

An object of the present invention is to provide a computer system in which a data set is caused to be resident in a virtual storage.

With the present invention, it is intended to make resident (i.e. reside) a virtual storage a data set such as a SAM (Sequential Access Method) data set, PAM (Partitioned Access Method) data set, VSAM (Virtual Storage Access Method) data set or the like.

Another object of the present invention is to provide a computer system in which file copy processing as well as duplicate file write processing can be effectuated effectively independent of recognition by program.

A further object of the present invention is to provide a computer system in which the magnetic disk unit and magnetic tape unit are made independent of the software.

SUMMARY OF THE INVENTION

A computer system includes a processing unit and an external storage. The external storage holds a virtual data set including an address translation table in addition to data/program. The processing unit includes a real storage for holding an address translation table transferred from the external storage when the virtual data set is opened and an address translation mechanism for making access to the real storage by translating the virtual address to the real address with the aid of the address translation table. When the data required by the processing unit is absent from the real storage, the processing unit sends the virtual address to the external storage and holds the data transferred from the external storage in the real storage. With this arrangement, the data set can reside in the virtual storage.

BRIEF DESCRIPTION OF THE DRAWINGS

FIG. 3A is a diagram illustrating the relation among an extended storage, an extended virtual storage and a virtual data set;

FIG. 16 is a view illustrating correspondence in format between a virtual magnetic tape unit and a virtual disk unit.

DESCRIPTION OF THE PREFERRED EMBODIMENTS

Now, the invention will be described in detail in conjunction with an exemplary embodiment thereof by reference to the drawings.

Figure 1:
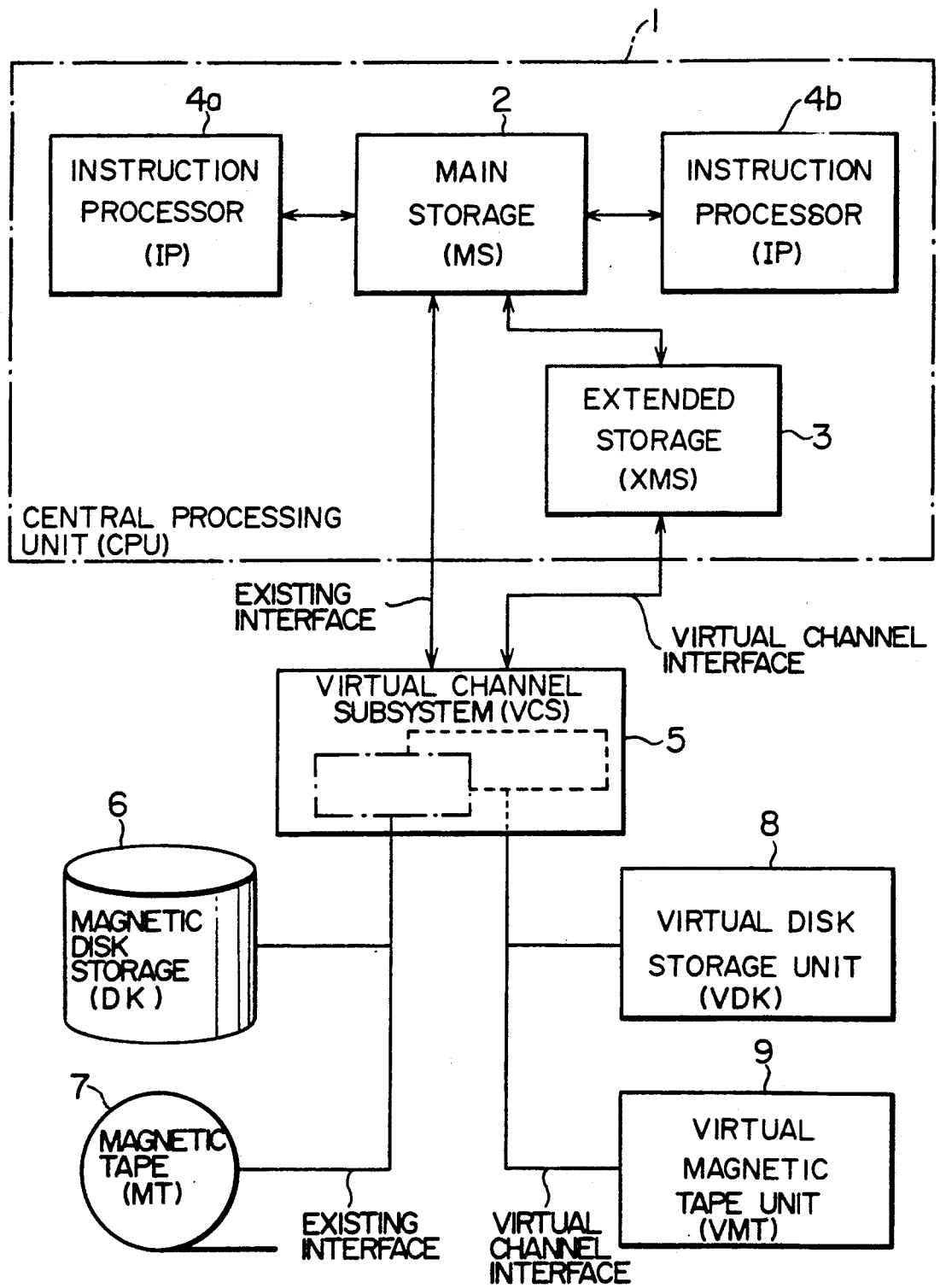
FIG. 1 is a block diagram showing generally a hardware structure of a virtual storage type computer system according to an embodiment of the present invention.

FIG. 1 is a block diagram showing schematically a hardware structure of a computer system according to an embodiment of the present invention. In this figure, a reference numeral 1 denotes a central processing unit (CPU), 2 denotes a main storage (MS), 3 denotes an storage (XMS), and 4a and 4b denote instruction processors (IP), respectively. Further, a numeral 5 denotes a virtual channel subsystem (VCS), 6 denotes a magnetic disk storage (DS), 7 denotes a magnetic tape storage (MT), 8 denotes a virtual disk unit (VDK) and a numeral 9 denotes a virtual magnetic tape unit (VMT). The central processing unit or CPU 1 includes the main storage MS 2 in which a program is stored and the extended storage (XMS) 3 for storing data sets and performs data processing through cooperation with the instruction processors (IP) 4a and 4b. The data set which undergoes the data processing in the CPU 1 is transferred through the virtual channel subsystem (VCS) 5 to an external storage, such as the magnetic disk storage (DS) 6, the magnetic tape unit (MT) 7, the virtual disk unit (VDK) 8, the virtual magnetic tape unit (VMT) 9 or other storage, as the case may be, to be stored therein. On the other hand, the data set incoming from the external storage is transferred by way of the virtual channel subsystem (VCS) 5 to the main storage (MS) 2 or the extended storage (XMS) 3 incorporated in the CPU 1 to be stored therein. Incidentally, it should be mentioned that the virtual magnetic tape unit 9 and the virtual disk unit 8 serving as an external storage are handled in a manner similar or equivalent to the magnetic tape unit 7 and the magnetic disk unit 6 from the stand point of system architecture.

Figure 2:
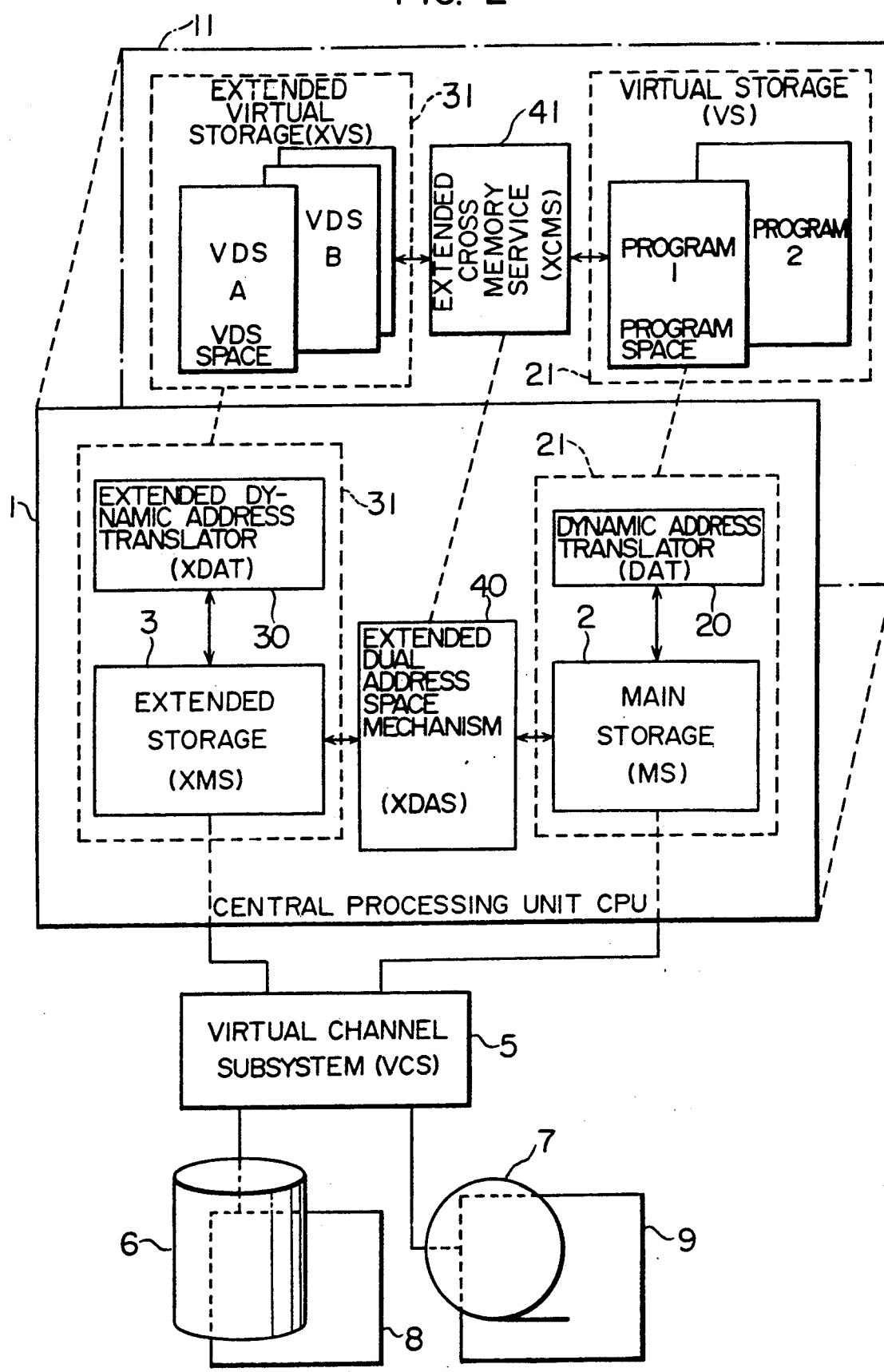
FIG. 2 is a block diagram showing a computer system in which virtual storages are logically provided to a central processing unit of the system shown in FIG. 1.

FIG. 2 shows a computer system 11 corresponding to the CPU 1 shown in FIG. 1 which is logically provided with virtual storages. In FIG. 2, a reference numeral 20 denotes a dynamic address translator (DAT) for translating a virtual address to a real address, and 21 denotes a virtual storage imparted with a large address space due to the provision of the dynamic address translator (DAT) 20. A reference numeral 30 denotes an extended dynamic address translator (XDAT) for translating an extended virtual address to an extended real address, and a numeral 31 denotes an extended virtual storage (XVS) imparted with a large address space due to the provision of the extended dynamic address translator (XDAT) 30. Further, a reference numeral 40 denotes an extended dual address space mechanism (XDAS), and 41 designates an extended cross memory service (XCMS). The extended dual address space mechanism (XDAS) 40 serves for moving data between the page space of the main storage (MS) 2 and the page space of the extended storage (XS) 3. A mechanism corresponding to the extended dual address space mechanism (XDAS) 40 from the logical standpoint is the extended cross memory service (XCMS) 41. The latter serves to move data between a virtual data set (VDS) space of the extended virtual storage (XVS) 31 and a program space (ADDRESS SPACE) of the virtual storage (VS) 21. It should be noted that the CPU 1 incorporates the instruction processors for performing data processing, although not shown in FIG. 2. The virtual channel subsystem (VCS) 5 serves to control the data transfer between the extended storage (XMS) 3 on one hand and the virtual disk unit (VDK) 8 and the virtual magnetic tape unit (VMT) 9 storing the virtual data set (VDS) which is the actual entity in the virtual data set (VDS) space of the extended virtual storage (XVS) 31 on the other hand. The virtual channel subsystem (VCS) 5 responds to the access request issued in terms of the virtual address from the CPU 1 to thereby make access to the virtual data set (VDS) space for performing data transfer to the extended storage (XMS) 3. The virtual channel subsystem (VCS) 5 is provided with an interface for transferring the data set used heretofore to the main storage (MS) 2 for the purpose of compatibility with the existing system. This interface is referred to as the virtual channel interface.

The extended storage (XMS) 3 serves to store the selected pages in the virtual data set (VDS) space and performs no execution of any instructions. For this reason, in the extended storage (XMS) 3, a large virtual space is available which is independent of the instruction addresses (of 16 MB, 2048 MB and others). This virtual space constitutes the extended virtual storage (XVS) 31. The extended virtual storage (XVS) 31 serves to store the virtual data set (VDS). When the virtual data set (VDS) is opened, a virtual space (i.e. the VDS space) is established in the extended virtual storage (XVS) 31. Subsequently, data transfer or transaction can be performed with the virtual data set (VDS) space in the extended virtual storage (XVS) 31 in response to the "MOVE" instruction under the control of the program stored in the virtual storage (VS) 21.

Figure 3B:
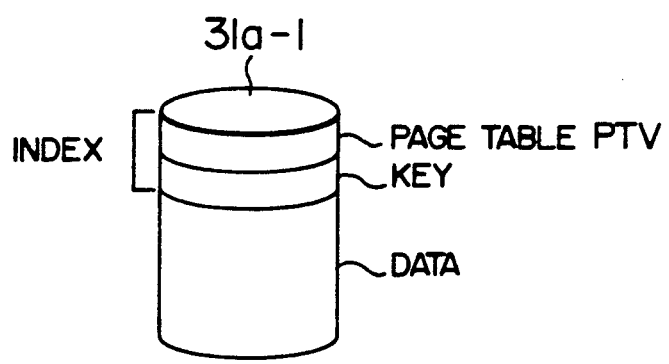
FIG. 3B is a view showing a format of the virtual data set.
Figure 3B:
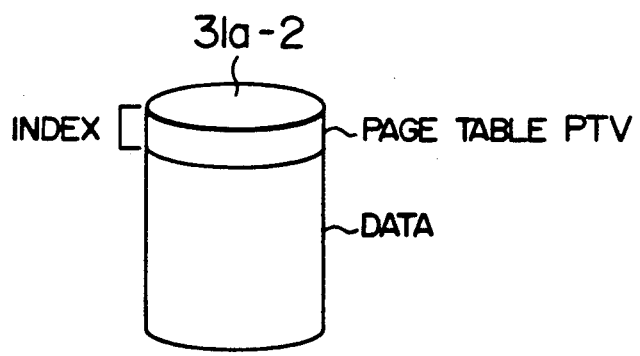
Figure 4:
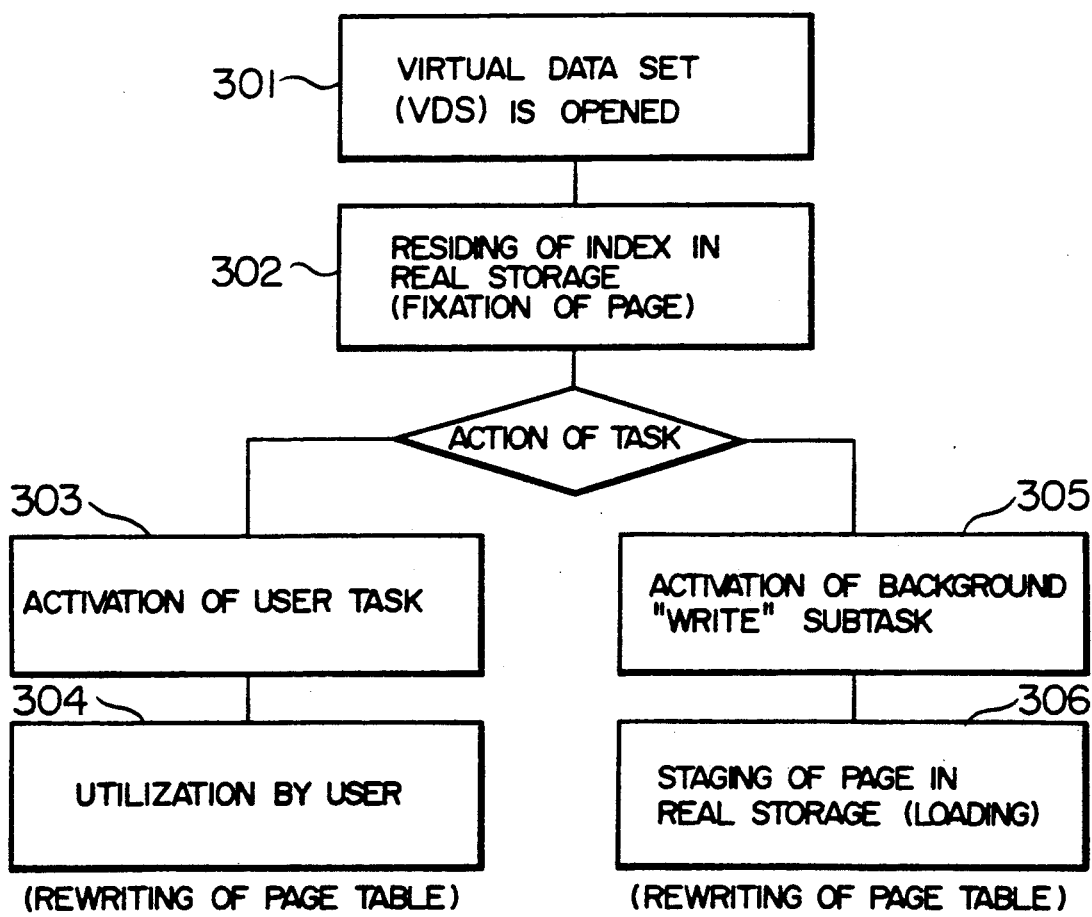
FIG. 4 is a flow chart illustrating a control flow for making resident the virtual data set in the virtual storage.

FIG. 3A illustrates the relations among the extended storage (XMS) 3, the extended virtual storage (XVS) 31 and the virtual data set (VDS) 31a. A page table (PTV) is provided for indicating the 3a relation between pages of the real storage and the virtual storage, as is well known in the art. The page table (PTV) shown in FIG. 3 indicates the correspondence between pages of the extended storage (XMS) 3 and the extended virtual storage (XVS) 31. The XVS 31 is a virtual storage, wherein the XVS 31 and the virtual data set (VDS) 31a are so established that the respective pages are mutually in one-to-one correspondence. More specifically, each slot of the virtual data set 31a corresponds to one page. Accordingly, there is no necessity for an external page table for indicating the correspondence between the virtual data set (VDS) space and the VDS 31a. FIG. 3B shows two formats of the virtual data set (VDS) in the virtual disk unit (VDK) 8. The VDS 31a-1 represents the virtual data set (VDS) accompanied by a key for the record in the data area, while VDS 31a-2 represents the virtual data set having no key. Each of the virtual data sets 31a-1 and 31a-2 includes the page table (PTV) for the virtual data set (VDS) which table is an address translation table. FIG. 4 shows a control flow for making resident the virtual data set (VDS). When the VDS 31a is opened (step 301 in FIG. 4), an index is stored in the extended storage (XMS) 3 (a real storage) for the purpose of page fixation (step 302). All of the data is paged-out at the time the virtual data set (VDS) 31a is opened so as to be loaded (staged) in the extended storage (XMS) 3 through a background "WRITE" subtask after task activation (steps 305, 306). By activating a user task (step 304), a user can make use of the data (step 304). The user utilization processing (step 304) and the staging processing (step 306) are executed in parallel. Upon page-in of data, the page table (PTV) is rewritten. Parenthetically, it should be mentioned that no problem will arise even when no background "WRITE" processing is performed.

Figure 5:
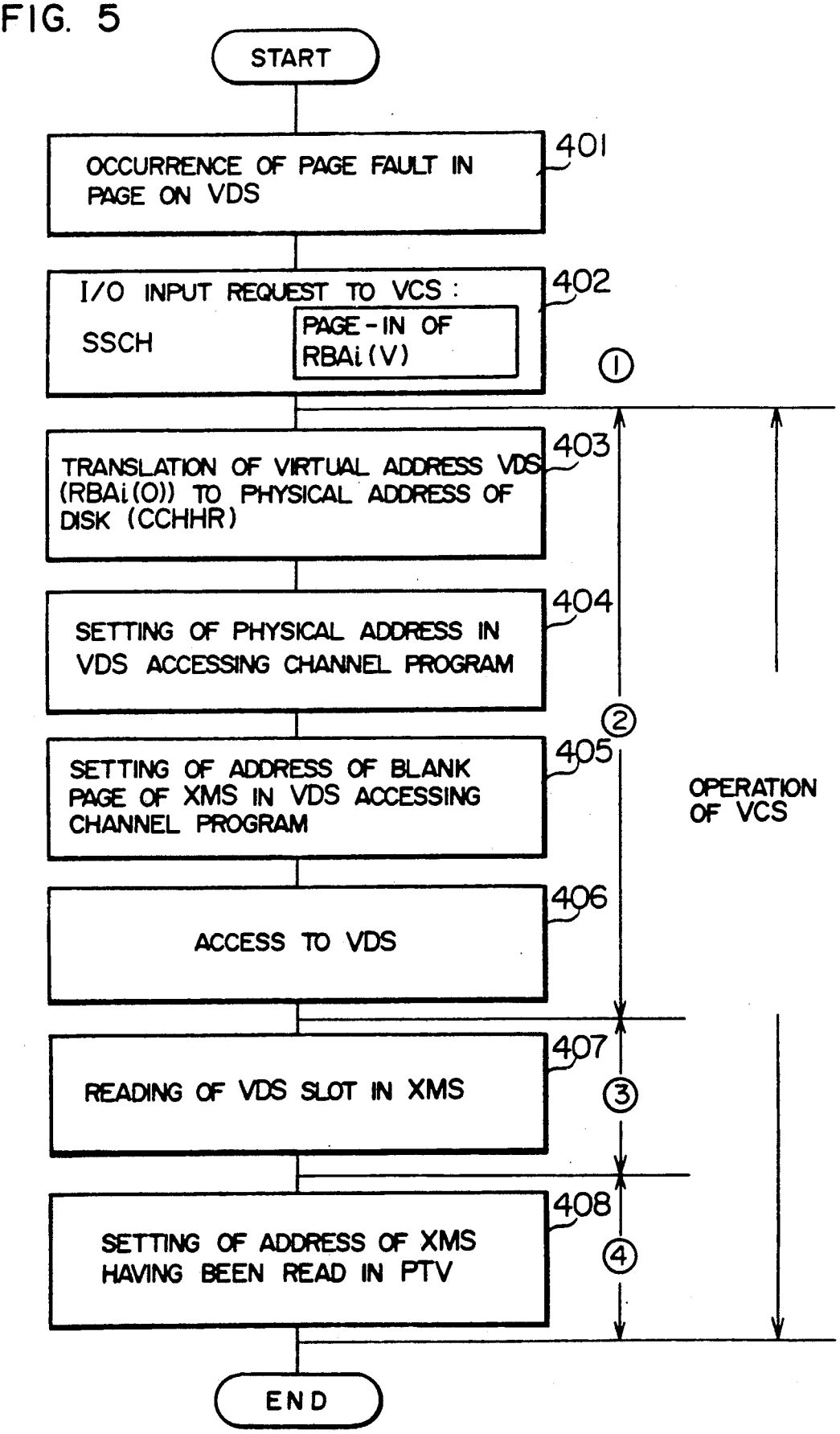
FIG. 5 is a flow chart illustrating a mapping processing executed by a virtual channel subsystem.

Next, a mapping function or mechanism of the virtual channel subsystem (VCS) 5 will be described in conjunction with the virtual disk storage unit (VDK) 8, by way of example, by referring to FIGS. 3 and 5. Steps 401 and 402 represent the processing executed by the program for controlling the access to the virtual data set (VDS) space 31. When a "READ" access request for the VDS space 31 in the extended virtual storage (XVS) is issued from the program stored in the virtual storage (VS), data in the extended storage 3 is loaded into the main storage (MS) 2 through cooperation of the extended dual address space mechanism (XDAS) 40, the extended dynamic address translator (XDAT) 30 and the dynamic address translator (DAT) 20. When invalid bits are present in the page table (PTV) 30, this means that the data for the address to which the request is issued is absent in the extended storage (XMS) 3, whereby a page fault takes place (step 401). Consequently, the CPU 1 issues an I/O request instruction "START SUBCHANNEL (SSCH)" to the virtual channel subsystem (VCS) 5 (step 402). This instruction SSCH includes a virtual address RBAi(V) for the data as requested and a command for the page-in. Operations at a series of steps indicated by respective numerals 2, 3 and 4 enclosed in circles in FIG. 5 are performed by the virtual channel subsystem (VCS) 5 which has firmware for accessing the extended storage (XMS), firmware for making access to the page table (PTV) and a channel program for input/output (I/O) of the virtual data set (VDS). The request issuer need not have the channel program since the request can be issued with the virtual address RBAi(V) of the extended virtual storage (XVS) 31. Further, since the extended storage (XMS) 3 is managed by the virtual channel subsystem (VCS) 5 itself, fixation of a page for fetching the data is rendered unnecessary, which is the reason for the naming of "virtual channel subsystem (VCS)". The VCS access request is made in terms of the SSCH instruction, wherein the page-in or page-out is designated by an ORB (operation request block). The virtual channel subsystem (VCS) 5 translates the given virtual address of the virtual data set (VDS) to a physical address (CCHHR) in the magnetic disk storage (step 403) and sets the physical address for the VDS accessing channel program with the aid of the XMS accessing firmware (step 404). Subsequently, the address of a blank page of the extended storage (XMS) 3 in which the page read out from the virtual data set (VDS) is to be stored is set in the VDS accessing channel program (step 405). Then, access is made to the virtual data set (VDS) 31a (step 406) to load a slot (having a size corresponding to one page) of the virtual data set (VDS) 31a in the extended storage (XMS) 3. Thereafter, the address in the extended storage (XMS) for which the loading has been made is set in the page table (PTV) 3a through the PTV accessing firmware. The paging procedure is processed in this manner upon occurrence of the page fault in the extended storage (XMS) 3.

Figure 6:
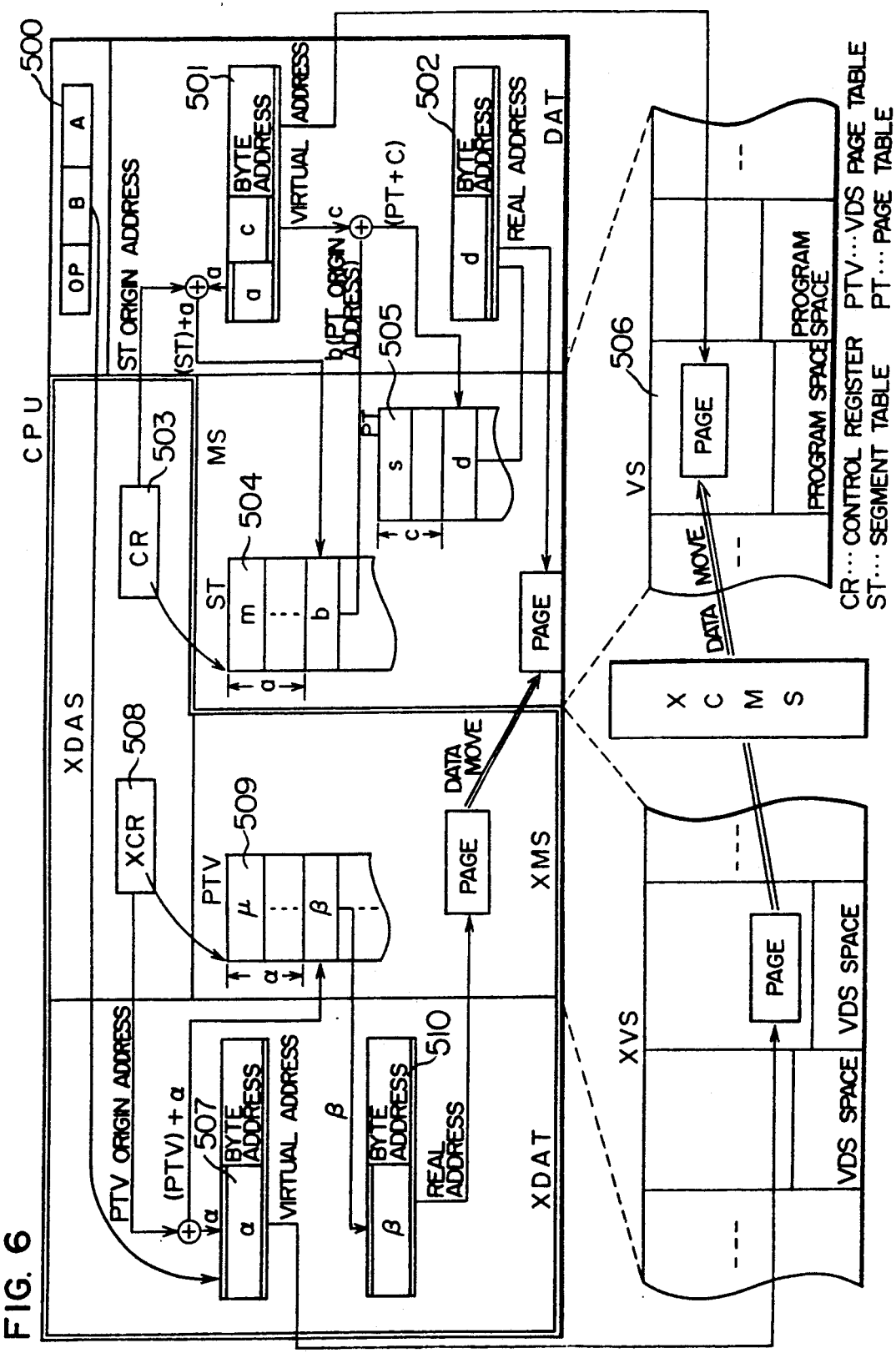
FIG. 6 is a view showing a system configuration for accessing the storage.

FIG. 6 shows a configuration and the operation for the memory access system.

Although the main storage (MS), the dynamic address translator (DAT) and the virtual storage (VS) are the same as employed in the virtual storage system known heretofore, description will first be made of them. The virtual address given by a program is placed in a register 501. The virtual address set at the register 501 corresponds to the content of an operand field of an instruction register 500. For the register 501, an index register or base register known per se may be employed. The dynamic address translator (DAT) 20 performs address translation by consulating a segment table (ST) and a page table (PT) located in the main storage (MS) 2 with the aid of the operating system. In contrast to the page table PTV for the extended storage 3 which is included in the virtual data set (VDS) and loaded in the extended storage (XMS) 3 at the time the virtual data set is opened, the segment table (ST) and the page table (PT) are placed in the main storage (MS) 2 by the operating system. A control register (CR) 503 is loaded with the origin address of the segment table (ST) which differs from one to another program space. With the value of the origin address of the segment table (ST) and the more significant bits a (segment address field) of the virtual address, the origin address b of the page table (PT) containing the entry having a displacement equal to a of a particular segment table 504 is read out, followed by the read-out of the address d (real address of the entry having a displacement indicated by the virtual address c (page address field) of the page table 505 indicated by the origin address b, wherein the address d is combined with a byte address (intra-page relocatable address), as the result of which the real address is placed in the register 502. With this address, access is made to the main storage MS 2. In this manner, the program can proceed with the processing as if the virtual storage (VS) was accessed. In reality, however, the real memory MS is accessed for the CPU to execute the programs. In this manner, the virtual storage system is realized.

In order to allow access to be made to the extended virtual storage (XVS) destined only for the virtual data set realized according to the teaching of the present invention, the address of data which is generated in the course of execution of a program and which is to be accessed is placed in a register 007 from the instruction register 500. The register 507 may have a larger number of bits than the register 501. Loading of the virtual address into the register 507 from the instruction register 500 may be performed through indirect address designation as in the case of the setting of an address in the register 501. Further, it is decided in dependence on the content of the operation code (OP) which of the register 501 or 507 is to be loaded with the operand address from the instruction register 500. The extended control register (XCR) 508 stores therein the origin address of the page table (PTV) 509, (3a) for the virtual data set (VDS) to be accessed from the program. The address of the entry having displacement corresponding to the more significant part of the virtual address of the page table (PTV) for the virtual data set is read out, whereby a real address resulting from combination with the byte address from register 507 is set in the register 510. With this real address, access can be made to the real memory (XMS). Although it is assumed that the address translation is carried out with the aid of only the page table, the translation also may be realized by using two stages of tables, i.e. a segment table and a page table as in the case of program. The extended control register (XCR) 508 is a register having a greater number of bits than the control register (CR) 503 which may be, for example, 32 bits.

Thus, when the operation code of the instruction register 500 indicates a "MOVE" instruction, the content of the page of the extended storage (XMS) 3 indicated by the register 510 is moved to the page of the main storage (MS) 2 indicated by the register 502. In this way, movement of data between the main storage (MS) and the extended storage (XMS) is made possible. In appearance, this move of data takes place as a data move between the program space in the virtual storage (VS) and the virtual data set (VDS) space in the extended virtual storage (XVS).

By virtue of the arrangement described above, data is available through the control for accessing the virtual data set in place of the control for making access to the disk. Accordingly, it is unnecessary to prepare the channel program as a program in the virtual storage VS. Besides, the data can be made available at an increased speed.

Figure 7:
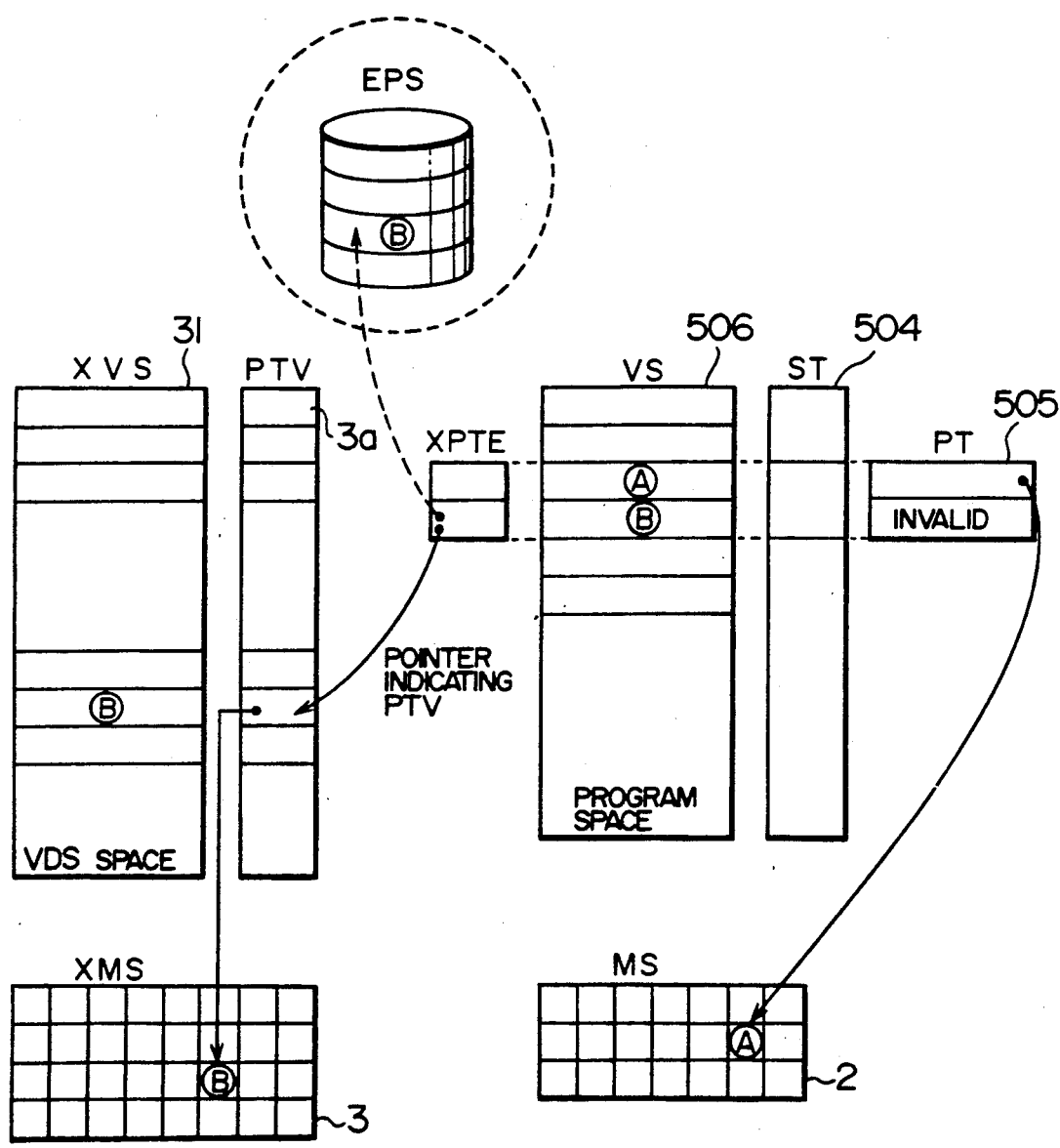
FIG. 7 is a view illustrating functions of an external page table.

FIG. 7 is a view for illustrating the possibility of replacing an external page storage (EPS) constituting a page data set and employed heretofore by the extended virtual storage (XVS). In FIG. 7, a page Ⓐ in the virtual storage (VS) is paged-in to the main storage (MS). On the other hand, a page Ⓑ indicates that the page table (PTV) is invalid and it is not paged-in to the main storage (MS). Upon occurrence of a data request for the page Ⓑ, the prior art external page table (XPTE) points to the page data set EPS (as indicated by a broken line in FIG. 7), and the page-in is performed from the external page table (XPTE) to the main storage (MS). In contrast, according to the present invention, the pointer of the external page table (XPTE) points to the entry in the page table (PTV) for the extended virtual storage (XVS) holding the page Ⓑ. With this arrangement, even when the page fault occurs in the program space of the virtual storage (VS) at the time when data of the page Ⓑ is requested, it is possible to obtain the data from the virtual data set (VDS) space in the extended virtual storage (XVS). This also means that the size of the main storage (MS) is free from limitation imposed on the virtual address. In this way, the page data set can be replaced in the extended virtual storage (XVS). Through replacement of the external page set (EPS) in the extended virtual storage (XVS), all the data sets can serve as the XVS interface (virtual channel interface).

Next, description will be made of copying and duplicate writing of a file (data set).

In the prior art data processing system for performing file processing for the file data stored in a magnetic disk unit, magnetic tape unit or the like which constitutes the external storage, the file processing such as file copying, duplicate file writing or the like processing is performed as the measures for coping with data erasure, data destruction or the like fault. When file processing such as copying or writing a file in duplicate, is performed, an I/O instruction is issued twice to a magnetic disk unit or magnetic tape unit in which the file of concern is stored to thereby make access twice to one and the same file, whereby the copying processing and the duplicate write processing are performed through double file processings. In such twofold file processings, the access to the file of concern is accomplished by way of the channel subsystem established by generating a channel program and issuing an I/O request to the channel system in accordance with control by the channel program for every one of the file processings. Accordingly, when the file processing, such as the file copying and the duplicate file writing, is constantly performed as a measure against a fault, such as data erasure or destruction, the overhead as well as the burden imposed on the system control program is unavoidably increased, not to the large amount of time involved in the file processing.

In the case where the data set to be stored in the magnetic disk unit or magnetic tape unit is to be written in duplicate in a file, it is necessary to generate a channel program for issuing twice the I/O request to the channel. When the file is to be copied, a data set (i.e. data set to be copied) on an input medium must be read in a buffer memory of the main storage in accordance with the channel program, while the data set of concern is required to be written out on an output medium.

In this manner, when access is to be made to an external storage such as, for example, a magnetic tape unit in which a data set of concern is stored, a channel program is generated, and an I/O request is issued to the channel system for allowing the access to the magnetic tape unit by way of the channel system. As a consequence, the time taken for making access to the magnetic tape unit undergoes a limitation imposed by the data transfer rate in the channel and the time for accessing the magnetic tape unit.

Further, since the magnetic tape unit operates in synchronism with operation of the channel program, the magnetic tape unit is occupied by the channel program when the latter is being executed. Consequently, in the case of file processing in which the data processing is performed and the processed data is outputted to sequential files in the magnetic tape unit, the data outputs are performed sequentially for the magnetic tape unit. Thus, the magnetic unit has to operate in correspondence to the processing operation of the processing program. In this manner, the file processing for the magnetic tape unit is performed in correspondence with the individual magnetic tape units, respectively. It is thus impossible to run simultaneously a greater number of processing programs than that of the physically existing magnetic tape units.

Further, in order to make usable a modern unit such as, for example, a cartridge tape unit and a digital audio tape recorder in place of the magnetic tape unit, alternation or modification of the operating system (system control program) and user program is necessitated.

With the present invention, it is also intended to solve the problems mentioned above and make it possible to perform file processing with enhanced efficiency.

Figure 8:
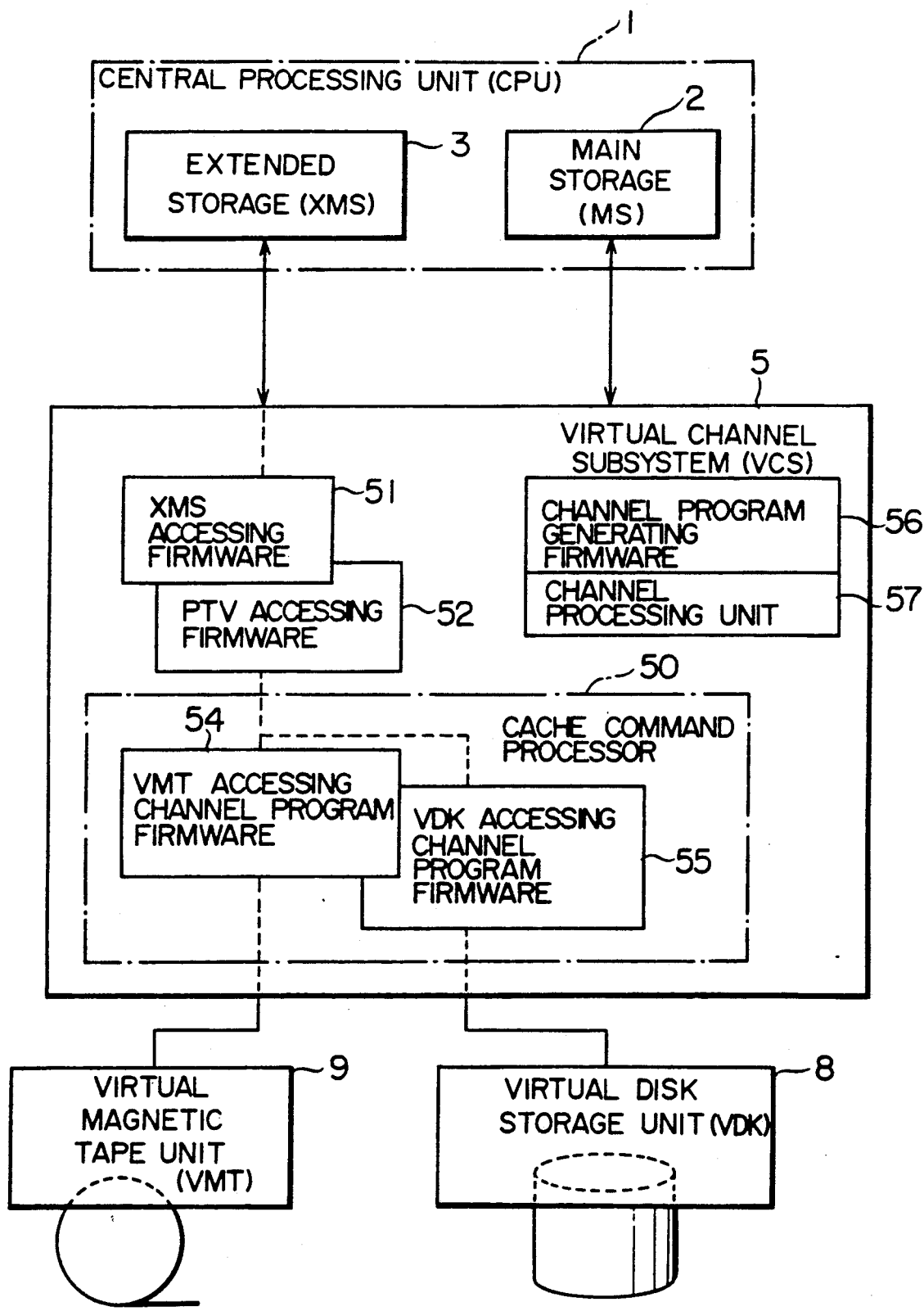
FIG. 8 is a view showing a concrete example of the virtual channel subsystem shown in FIG. 1.

FIG. 8 shows a structure of the virtual channel subsystem (VCS) 5 in the computer system shown in FIG. 1. The virtual channel subsystem (VCS) 5 includes a channel generating firmware 56 for generating a channel program in response to a given command, a channel processing unit 57 having the same processing function as that of the prior art channel system and a cache command processing unit 50. The channel processing unit 50 performs data transfer with the external storage, the main storage (MS) 2 or the extended storage (XMS) 3 for reading out a data set from the external storage and for writing that data set in the main storage (MS) 2 or the extended storage (XMS) 3. When the channel processing unit 57 reads out a data set from the main storage (MS) 2 or the extended storage (XMS) 3 to thereby write the data set in the external storage, the cache command processing unit 50 performs in correspondence with the transfer processing for the data set of concern an additional transfer processing (the cache command processing, i.e. a processing for writing the data set separately in the external storage in the case of the illustrated example). To this end, the cache command processing unit 50 includes a VMT access channel program firmware 54 for performing access to the virtual magnetic tape unit (VMT) 9, and a VDK access channel program firmware 55 for performing access to the virtual disk unit (VDK). On the other hand, the virtual channel subsystem (VCS) 5 includes an XMS access firmware 51 for making access to the extended storage (XMS) 3 and a PTV access firmware 52 for accessing the page table (PTV) used for management of the extended data set (XDS) space.

Now, description will be made of the virtual data set (VDS) in the VDS space provided on the extended virtual storage (XVS) in correspondence with the virtual disk unit (VDK) and the virtual magnetic tape unit (VMT). In this connection, the virtual disk unit (VDK) or the virtual magnetic table unit (VMT) may be an actual entity which virtually appears to be a disk storage and a magnetic tape with the formats stored therein being in the forms of the virtual data space (VDS) illustrated in FIG. 3A or 3B or FIG. 16.

The virtual data set (VDS) is employed for the data set as in the case of the prior art virtual storage system for extending the address space for the program to serve for managing the data set by performing the page-in/page-out of the data set with the aid of the page table. More specifically, the page table (PTV) is read, for example, into the extended storage (XMS) for the page fixation, whereupon the data set is opened. At this time point, although all the pages are in the page-out state, a space for the data set of concern is opened in the virtual data set space on the extended virtual storage (XVS) to permit the access to the data set of concern. Subsequently, every time the data of the data set is needed, the page of the data set is read into the extended storage (XMS) in response to the page-in request issued by the system control program. This is equivalent to the state in which the data set is resident in the extended storage (XMS).

Figure 9A:
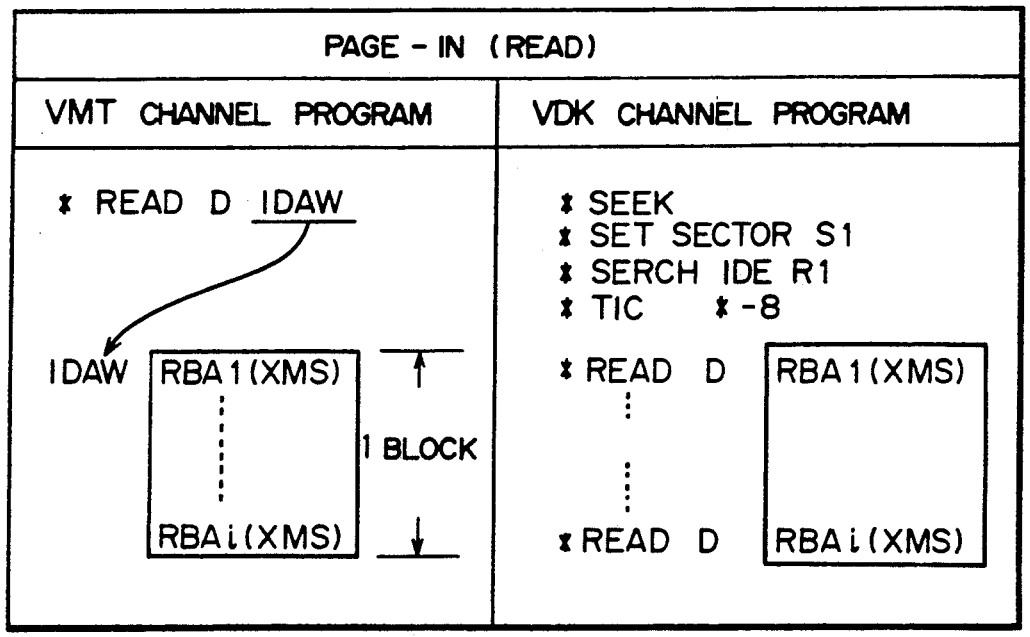
FIGS. 9A and 9B are view illustrating, by way of example, channel programs incorporated in the virtual channel subsystem.
Figure 9B:
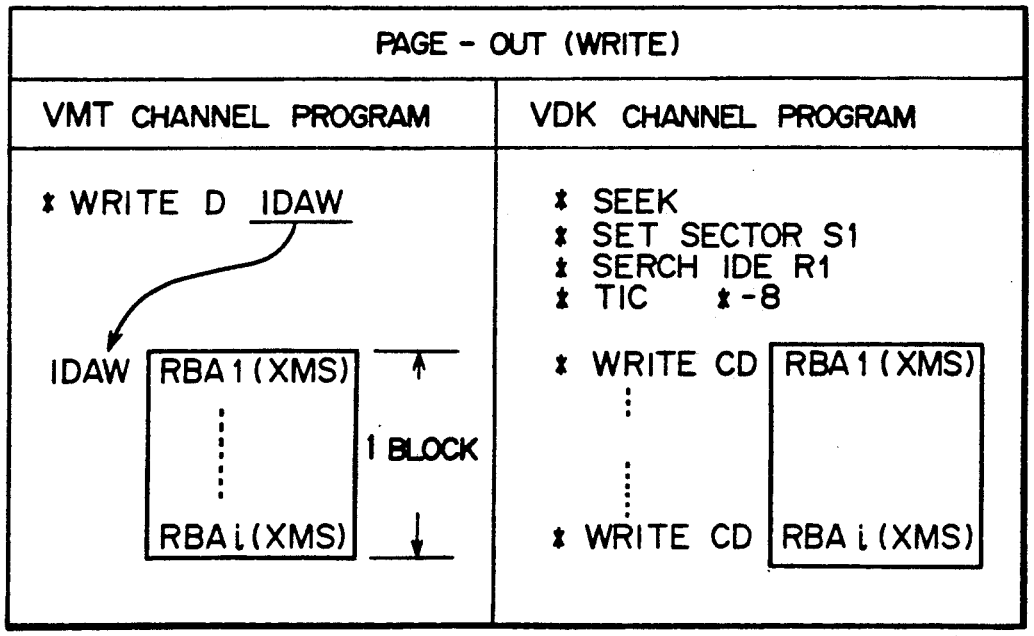

The virtual channel subsystem (VCS) 5 makes access to the virtual data set (VDS) in response to a request command from the system control program. The access to the virtual data set (VDS) is performed from the channel program generated by the virtual channel subsystem (VCS) 5. The channel programs generated by the virtual channel subsystem (VCS) 5 include a program for the virtual disk unit (VDK) 8 (i.e. VDK channel program) and a program for the virtual magnetic tape unit (VMT) 9 (i.e. VMT channel program). These channel programs are to serve for making access to the virtual disk unit (VDK) 8 and the virtual magnetic tape unit (VMT) 9, respectively, and they are generated from the program incorporated in the firmware. FIGS. 9A and 9B show examples of the channel programs of concern, respectively. As will be seen in these figures, a "READ" channel program (FIG. 9A) for performing the page-in operation and a "WRITE" channel program (FIG. 9B) for the page-out operation are provided for the virtual disk unit (VDK) and the virtual magnetic tape unit (VMT), respectively. Since the VMT channel program for accessing the virtual magnetic tape unit (VMT) performs I/O operation on the block (page x i) basis, control by the indirect data addressing word (IDAW) is made use of. On the other hand, the "READ" or "WRITE" command chain in the VDK channel program for accessing the virtual disk unit (VDK) is to make possible the data I/O operation of one block to the virtual disk unit (VDK) or the continuous data I/O operation to the virtual data set (VDS) for coping with the case where the counterpart to be accessed in the cache command processing is the virtual magnetic tape unit (VMT).

When pages of the virtual disk unit (VDK) or the virtual magnetic tape unit (VMT) are to be developed on the extended storage (XMS), blank pages are needed, which are managed by the XMS access firmware 51 (FIG. 8). For this purpose, an extended page frame table is employed which is updated by the XMS access firmware 51 in response to the page-in request from the system control program.

When the data set stored in the extended storage (XMS) through the page-in or page-out is updated, it is then necessary to update correspondingly the page table (PTV). This page table update processing is performed by the PTV access firmware 52. When the extended storage (XMS) is updated due to the data transfer through the channel processing performed by the virtual channel subsystem (VCS) 5, the PTV access firmware 52 sets a valid bit or an invalid bit in the page table PTV at the corresponding address of the extended storage (XMS). It is assumed that when an input or output data move instruction is issued for the virtual data set (VDS) from the program, e.g. when the input data instruction is issued, a page fault occurs in the virtual data set (VDS) space. In that case, the virtual channel subsystem (VCS) 5 starts the I/O operation by issuing the I/O request to the virtual disk unit (VDK) or the virtual magnetic tape unit (VMT). On the assumption mentioned above, however, the virtual channel subsystem (VCS) 5 performs the I/O operation by issuing I/O request (cache command) for performing the processing to write the same page of the data set of concern in another virtual data set on the virtual disk unit (VDK) or the virtual magnetic tape unit (VMT). At that time, the page table is used in common. In this way, the duplicate write processing of a file or the file copy processing can be performed with a single command issued by a user.

Cache commands set in correspondence with the command issued by the user can be set arbitrarily. In Table 1, examples of combinations of the commands issued by the user and the cache commands are listed together with examples of use or application.

TABLE 1

| Command issued by user | Cache command | Application |
| --- | --- | --- |
| Page-in (READ) | Page-in (READ) | 1. Reading in duplicate of VDK (cache command is executed only when original command is error) |
| | Page-out (WRITE) | 1. Copying of VDK or VMT |
| Page-out (WRITE) | Page-in (READ) | |
| | Page-out (WRITE) | 1. Writing in duplicate of VDK or VMT (parallel processing is possible)<br>2. Writing in duplicate of VDK and VMT (parallel processing is possible) |

As will be seen in Table 1, the cache command to be combined with the commands issued by the user can be set arbitrarily. However, since the cache command is of the "READ" type, application or utilization thereof is limited. Accordingly, description of the instant embodiment is made on the assumption that the system is so arranged as to use the cache command of the "WRITE" type.

Now, operation of the computer system will generally be described by referring to FIGS. 2 and 8. The extended storage (XMS) 3 (or extended virtual storage XVS 31) incorporated in the central processing unit (CPU) 1 serves as a storage in which data sets are stored. The extended storage (XMS) 3 is managed by the virtual channel subsystem (VCS) 5 and is used differently from the main storage (MS) 2 (or virtual storage VS 21) in which programs are stored. On the other hand, the extended storage (XMS) 3 is managed by means of the extended page frame table indicating the status of utilization of the XMS 3, while the extended page frame table is managed by the virtual channel subsystem (VCS) 5. This corresponds to consulation of the page frame table by the CPU 1 for checking the status of utilization of the main storage (MS) 2. The extended dynamic address translator (XDAT) 30 operates to map the virtual data set (VDS) space of the extended virtual storage (XVS) 31 by using the individual pages of the virtual data set (VDS) on the extended storage (XMS) 3 and the page table (PTV). More specifically, the extended dynamic address translator (XDAT) 30 translates the virtual address of the virtual data set (VDS) space in the extended virtual storage (XVS) 31 in which the virtual data set (VDS) is stored to the real address in the extended storage (XMS) 3. Software for performing the data move between the virtual data set (VDS) space in the extended virtual storage (XVS) 31 and the program space on the virtual storage (VS) 21 is the extended cross memory service (XCMS). The extended cross memory service (XCMS) is a logical mechanism and corresponds to such physical aspect that the main storage (MS) 2 and the extended storage (XMS) 3 are interconnected by the extended dual address space mechanism (XDAS) 40, wherein data movement to or from the central processing unit (CPU) 1 is performed through the extended dual address space mechanism (XDAS) 40.

The virtual magnetic tape unit (VMT) 9 is so implemented that the content of the data set in the magnetic tape unit (MT) 7 coincides with that of the virtual data set (VDS) on the virtual disk unit (VDK) 8. To this end, the virtual magnetic tape unit (VMT) 9 may be realized by copying the data set in the magnetic tape unit (MT) 7, for example, through the file copy processing in the cache command processing performed by the virtual channel subsystem (VCS) 5 to generate the corresponding virtual set. The data copy mentioned above can be carried out in two different ways. According to the first copy method, the data set in the magnetic tape unit is physically copied into the virtual disk unit (VDK). According to the second method, the data set in the magnetic tape unit is not physically copied in the virtual disk unit (VDK) but is developed only in the extended storage (XMS) 3. Because the file processing is performed in accordance with the processing program in the case of the second method, the simultaneous access processing is not performed by the cache command processing unit 50 of the virtual channel subsystem (VCS) 5 (i.e. file copy processing is not executed). Consequently, the processing by the program and the processing by the magnetic tape unit are synchronous with each other. The second mentioned copying method can be advantageously adopted when the virtual magnetic tape unit (VMT) 9 is of a large data capacity and is utilized in the file processing of the forward access mode.

The virtual storage (VS) 21 is composed of the dynamic address translator (DAT) 20 and the main storage (MS) 2, wherein the virtual storage (VS) 21 serves as the logical storage area for programs, while the main storage (MS) 2 serves as the physical storage area for the programs. The program storage area is divided on a page basis.

The extended virtual storage (XVS) 31 serves as the logical storage area for the data set of the virtual disk unit (VDK) 8 and for the data set of the virtual magnetic tape unit I (VMT) 9, while the extended storage (XMS) 3 serves as the physical storage area for the data sets mentioned above. The data set of the virtual disk unit (VDK) 8 and that of the virtual magnetic tape unit (VMT) 9 are virtual data sets (VDS), respectively, wherein the slot (page) of the virtual data set (VDS) is stored in the extended storage (XMS) 3 by way of the virtual channel subsystem (VCS) 5. Stated in another way, the extended storage (XMS) 3 serves as the input-/output buffer for the virtual channel subsystem (VCS) 5. The data set in the virtual magnetic tape unit (VMT) 9 is put into correspondence with the data set in the virtual disk unit (VDK) 8, both data sets being stored in the same format as the virtual data set (VDS). Such correspondence is established when the virtual channel subsystem (VCS) 5 performs a copying of the virtual data set (VDS). The virtual data set is opened in the virtual data set space in the extended virtual storage (XVS) 31 upon opening of the data set. Subsequently, the page-in and the data movement to the virtual data set space can be effectuated in accordance with the move command issued from the program in the virtual storage (VS) 21. The virtual channel subsystem (VCS) 5 makes access to the virtual data set (VDS) and develops the individual pages in the extended storage (XMS) 3. At that time, the I/O request to the virtual channel subsystem (VCS) 5 can be realized with the virtual address of the virtual data set space.

The virtual channel subsystem (VCS) 5 makes access to the virtual disk unit (VDK) 8 or virtual magnetic tape unit (VMT) 9 in response to the I/O request issued from program in terms of the virtual address of the virtual data space (VDS), for thereby performing the page transfer to the extended storage (XMS) 3. The channel program for making access to the virtual data set of the virtual disk unit (VDK) or the virtual data set in the virtual magnetic tape unit (VMT) is incorporated in the virtual channel subsystem (VCS) 5 implemented as firmware. The virtual channel subsystem 5 is imparted with the interface for the access function in accordance with the channel program generated by CPU 1 through the data set accessing procedure (such as VSAM, SAM, PAM and others) known heretofore. The prior art data set performs data transfer with the main storage (MS) 2, while the interface for the virtual disk unit (VDK) or the virtual magnetic tape unit (VMT) performs page transfer with the extended storage unit 3.

The I/O operation relative to the extended storage (XMS) 3 is performed by the virtual channel subsystem (VCS) 5 on a page basis for the virtual disk unit (VDK) 8 and on a block basis for the virtual magnetic tape unit (VMT) 9.

Next, the description will turn to the operation of the computer system implemented in the structure described above on the assumption that the virtual magnetic tape unit (VMT) is used as the magnetic tape unit and that the virtual disk unit (VDK) is employed as the magnetic disk unit.

Figure 10:
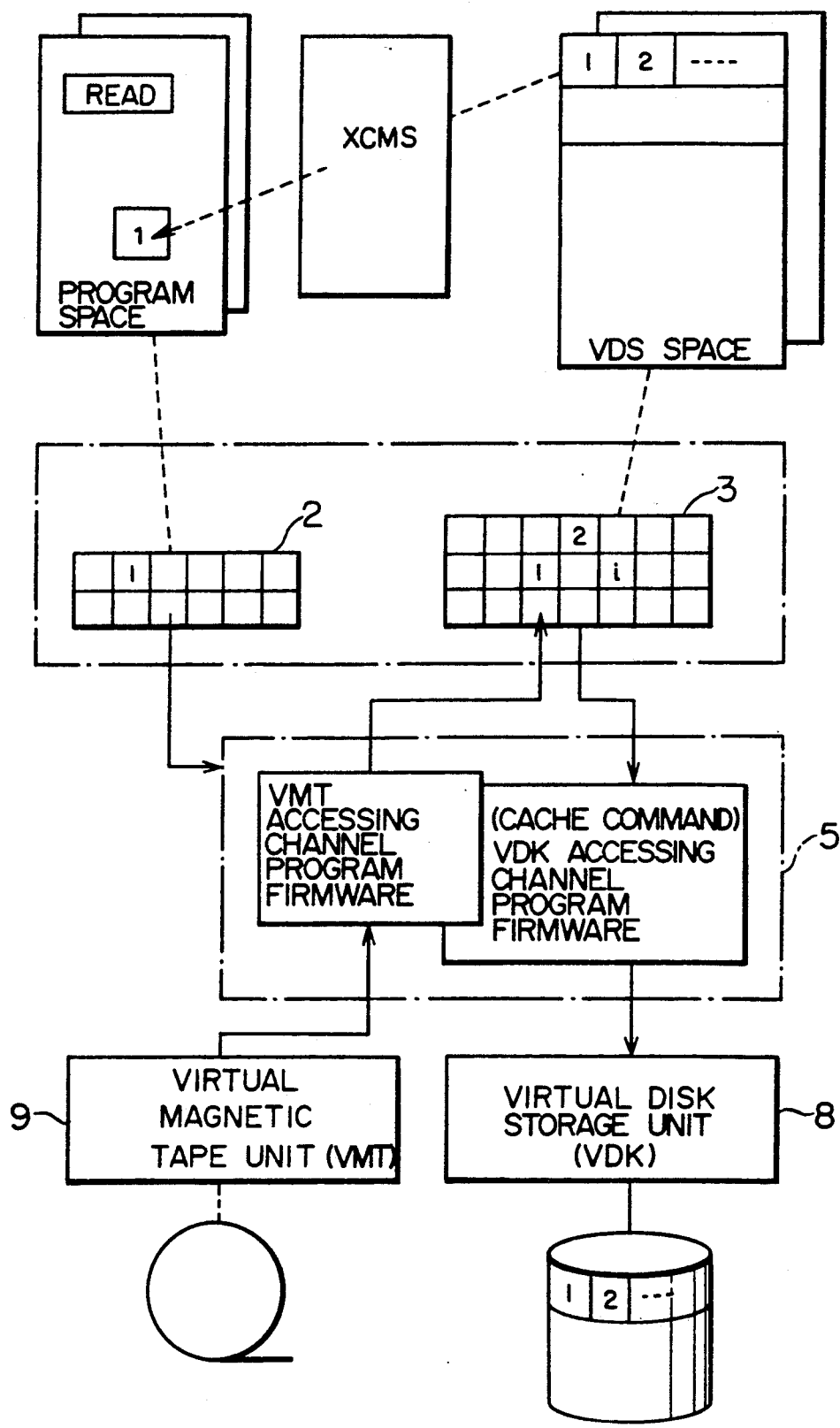
FIG. 10 is a view illustrating data flow in the processing for copying a data set of a virtual magnetic tape unit.
Figure 11:
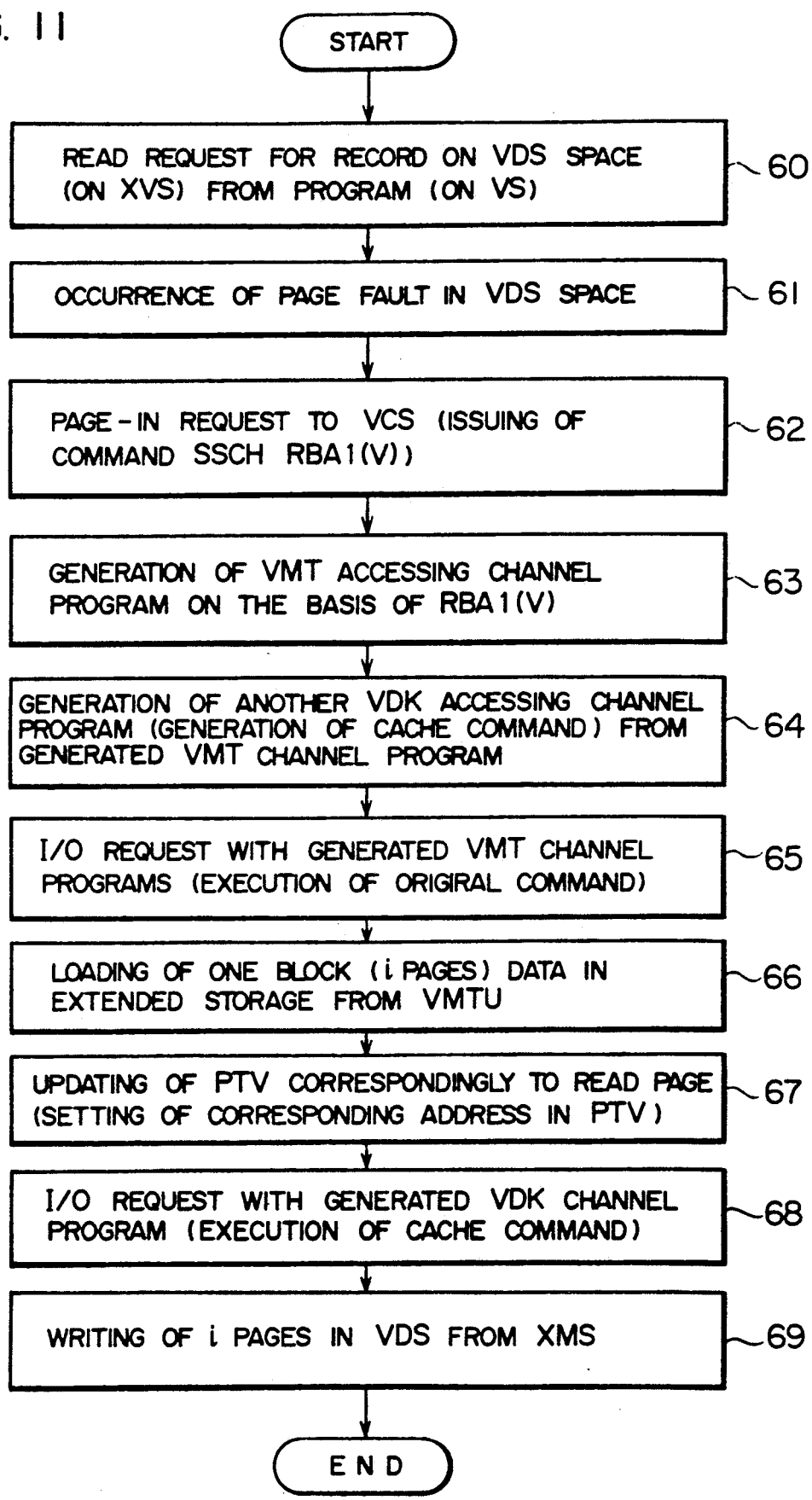
FIG. 11 is a flow chart illustrating the copy processing.

FIG. 10 is a view illustrating data flow in the copy processing for the data set in the virtual magnetic tape unit (VMT) and FIG. 11 is a flow chart illustrating the copy processings.

The copy processing will be described in accordance with the flow chart of FIG. 11 by referring to FIG. 10 as well. It is assumed that the virtual channel subsystem (VCS) 5 makes access to the virtual disk unit (VDK) 8 and the virtual magnetic tape unit (VMT) 9, wherein the virtual data set of the virtual magnetic tape unit (VMT) is copied into the virtual data set of the virtual disk unit (VDK) by utilizing the cache command.

A "READ" request is issued for reading the record on the page "1" of the data set in the virtual data set space from a program in the program space of the virtual storage (VS) 21 (step 60). In that case, however, when a page fault occurs because of absence of the page "1" of the data set for the record as requested in the extended storage (XMS) 3 (step 61), the operating system then issues to the virtual channel subsystem (VCS) 5 a page-in request (SSCH RBAl(V)×i) (step 62). Next, the virtual channel subsystem 5 generates a VMT channel program (original command) for accessing the virtual magnetic tape unit (VMT) 9 on the basis of the address RBAl(V) of the data set designated by the given page-in request (step 63) and then generates the VDK channel program (cache command) for accessing the virtual disk unit (VDK) from the generated VMT channel program mentioned above (step 64). Subsequently, the I/O request is executed with the generated VMT channel program (step 65: execution of original command) to thereby read one block of the data set (data set of i pages) from the virtual magnetic tape unit (VMT) 9 to be written into the extended storage (XMS) 3 (step 66). Next, the corresponding address of the pages as written are placed in the page table (PTV) to update the page table (PTV) (step 67). Subsequently, the I/O request is executed with the VDK channel program as generated (step 68: execution of cache command). Next, i pages are written in the virtual disk unit (VDK) from the extended storage (XMS) 3 (step 69). By repeating the series of processing described above, the copy processing is sequentially performed for a data set on the block basis.

In this way, one block of data is outputted to the virtual disk unit (VDK) through execution of the cache command. The user can request only the reading (READ request) of logical records in the virtual data set (VDS) space, which request can be processed only by the data move between the virtual data set space and the program space, so far as no page fault occurs. Upon occurrence of the page fault, processing for one block is performed. Similar processing is repeated. When the final record in the virtual magnetic tape unit (VMT) 9 has been read by the program, all the records are written into the virtual disk unit 8, whereupon the copying of the records as the virtual data set from the virtual magnetic tape unit (VMT) 9 to the virtual disk unit (VDK) has been completed. With the user program, the records of the virtual data set space are only read sequentially from the origin, wherein generation of the command, access to the virtual magnetic tape unit (VMT) and access to the virtual disk unit (VDK) are all executed by the virtual channel subsystem (VCS) 5.

Figure 12:
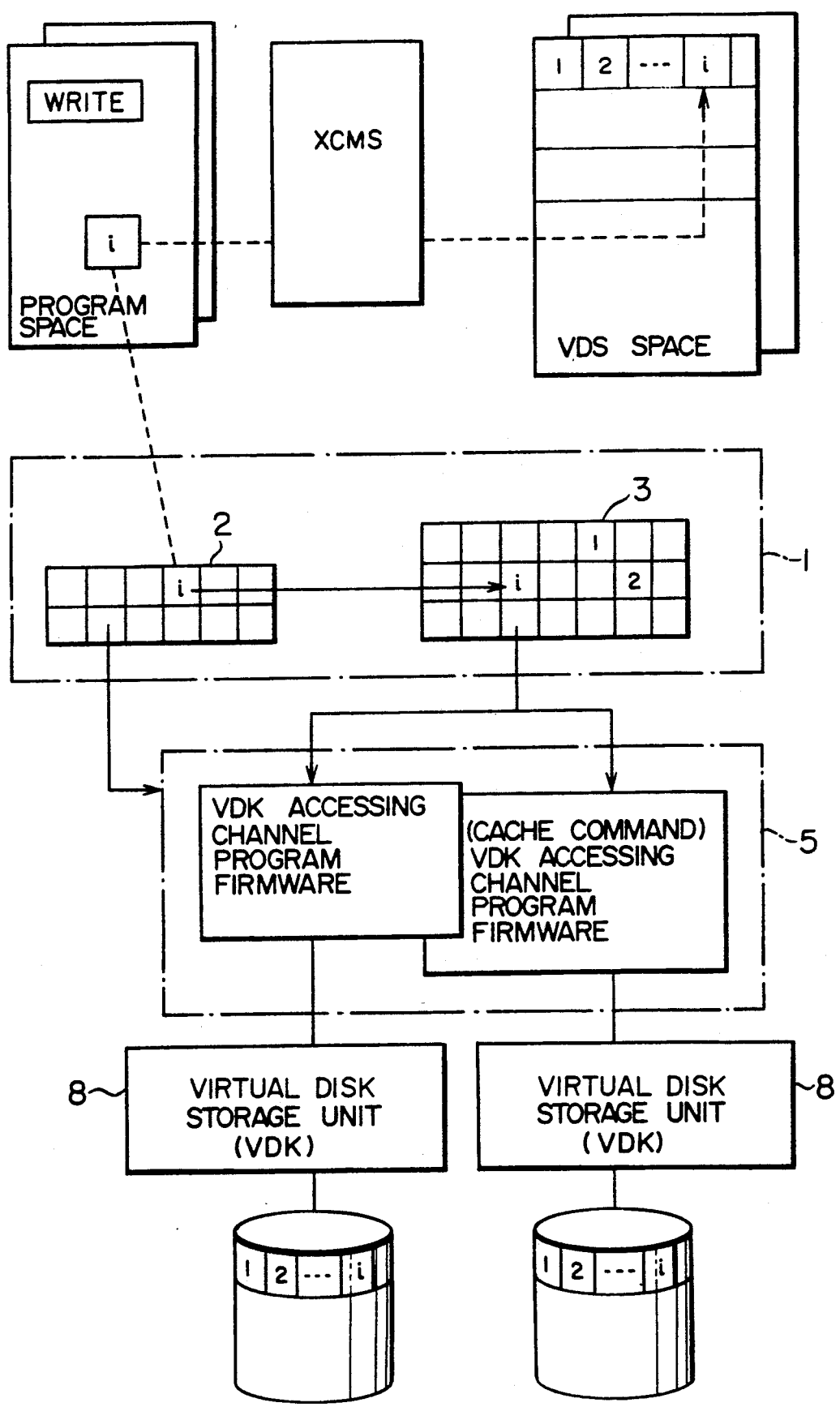
FIG. 12 is a view illustrating a data flow in a duplicate processing of a data set of a virtual disk unit.
Figure 13:
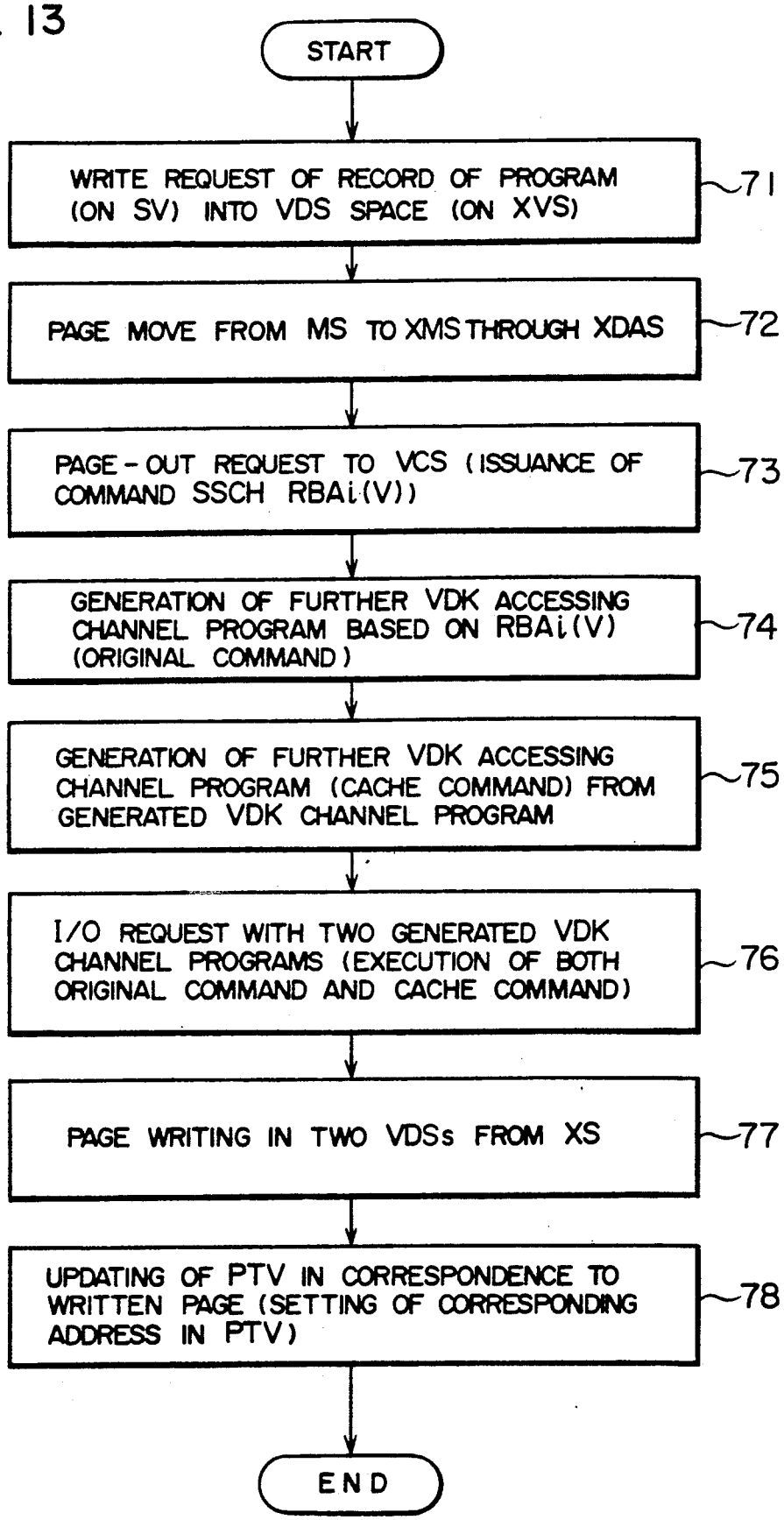
FIG. 13 shows a flow chart for illustrating the duplicate write processing of a data set.

FIG. 12 is a view illustrating the data flow in the duplicate write processing of the data set in the virtual disk unit (VDK), and FIG. 13 is a flow chart for illustrating the duplicate write processing.

Description will now be made of the duplicate write processing in accordance with the flow chart shown in FIG. 13 by referring to FIG. 12 as well. In this processing, the virtual channel subsystem (VCS) 5 makes access to the virtual disk unit (VDK) 8, wherein the same cache command as the original command is generated to allow the data set to be written in duplicate in the virtual disk unit (VDK).

A "WRITE" request for the records on the i pages in the virtual data set space is issued from the program in the program space of the virtual storage 21 (step 71). In response, the CPU 1 executes the page move from the main storage (MS) 2 to the extended storage (XMS) 3 by way of the extended dual address spaces mechanism (XDAS) (step 72). Next, the operating system issues the page-out request (SSCH RBAi(V)) to the virtual channel subsystem (VCS) 5 (step 73). The virtual channel subsystem (VCS) 5 generates a VDK channel program (original command) for accessing the virtual disk unit (VDK) 8 on the basis of the address RBAi(V) of the data set designated by the given page-out request (step 74), and then generates separately another VDK channel program (cache command) for accessing the virtual data set from the generated VDK channel program (step 75). Subsequently, the I/O request is processed with the two generated VDK channel programs (step 76: simultaneous execution of the original command and the cache command). Next, data of i pages is written in two virtual disk units (VDK) 8 from the extended storage (XMS) 3 (step 77). Then, the corresponding addresses of the pages as written are set in the page table (PTV) for thereby updating the latter (step 78).

In this manner, the duplicate write operation of the data set can be performed for the virtual disk units (VDK) 8.

Next, the description will turn to synchronization processing for the virtual magnetic tape unit (VMT) and program.

Figure 14:
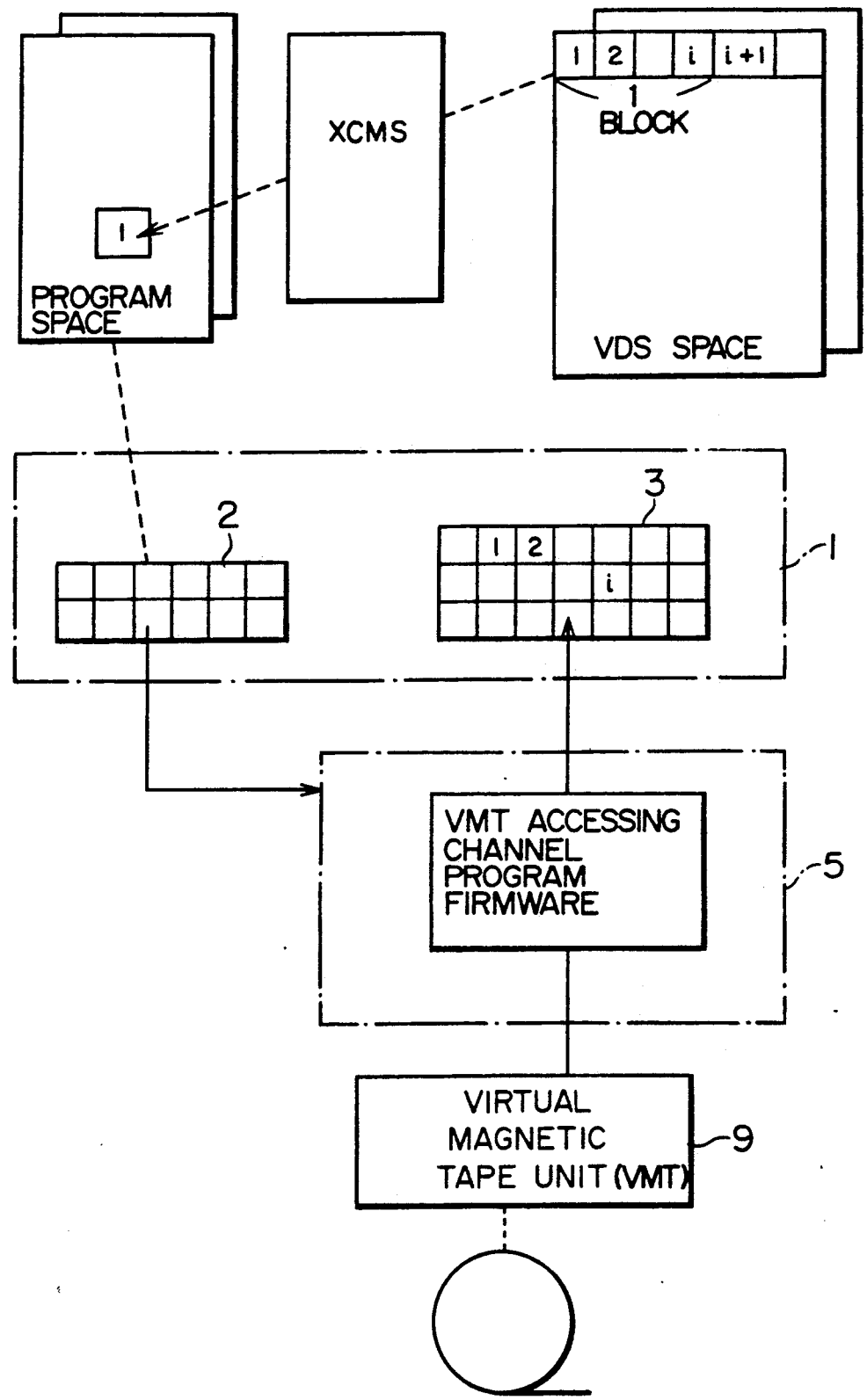
FIG. 14 is a view illustrating data flow in synchronization processing for a virtual tape unit and a program.
Figure 15:
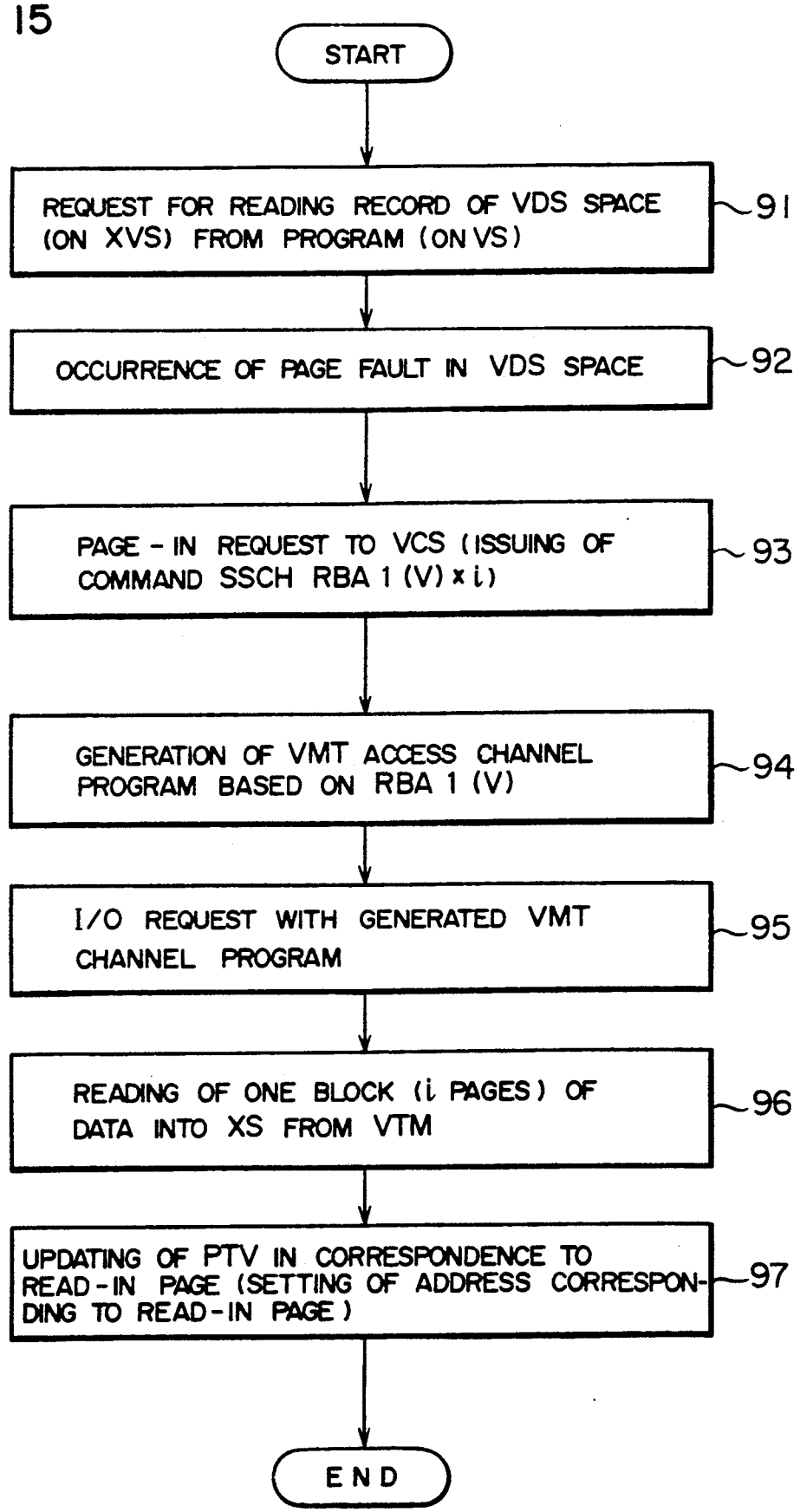
FIG. 15 is a flow chart showing the synchronization processing.

FIG. 14 is a view for illustrating data flow in the synchronization processing for the virtual magnetic tape unit (VMT) and the program, and FIG. 15 is a flow chart illustrating the synchronization processing. Further, FIG. 16 is a view illustrating a relation in format between the virtual magnetic tape unit (VMT) and the virtual disk unit (VDK).

Now, description will be made of the synchronization processing for the virtual magnetic tape unit (VMT) and the program in accordance with the flow chart of FIG. 15 by referring to FIG. 14 as well. In this processing, the virtual channel subsystem (VCS) 5 makes access to the virtual magnetic tape unit (VMT) 9. No cache command is used. This synchronization processing is made use of when the copy of data from the virtual magnetic tape unit (VMT) to the virtual disk unit (VDK) is impossible because of an excessively large amount of data in the VMT. Naturally, this synchronization processing can be made use of only in the forward access mode.

A "READ" request is issued for reading the record on page "1" of the data set in the virtual data set (VDS) space from a program in the program space of the virtual storage (VS) 21 (step 91). In that case, however, when a page fault occurs because of absence of page "1" of the data set for the record as requested on the extended storage (XMS) 3 (step 92), the operating system then issues to the virtual channel subsystem (VCS) 5 a page-in request (SSCH RBAl(V)×i) (step 93). Next, the virtual channel subsystem (VCS) 5 generates a VMT channel program (original command) for accessing the virtual magnetic tape unit (VMT) 9 on the basis of the data RBAl(V) designating the address given by the page-in request (step 94). Subsequently, the I/O request is executed with the generated VMT channel program (step 95) to read one block of the data set (data set of i pages) from the virtual magnetic tape unit (VMT) 9 to be written into the extended virtual storage (XVS) 31 (step 96). Next, the corresponding address of the pages as written are set in the page table (PTV) to update the page table (PTV) (step 97).

By repeating a series of processings in this manner, one block of the data set of the virtual magnetic tape unit (VMT) is set in correspondence to the pages of one block in the virtual data set space upon every processing for one block. The synchronization processing for the program and the virtual magnetic tape unit (VMT) is performed every time one block of the data set is processed.

Until the final record of the i-th page has been reached, the processing is executed through data moves between the extended storage (XMS) 3 and the main storage (MS) 2 in accordance with the program. A page fault will again occur at the time point when the (i+1)-th record is read. Subsequently, through the same procedure as that of the first processing, the virtual channel subsystem (VCS) 5 reads the next block from the virtual magnetic tape unit (VMT). The processing is continued to the final block.

In the foregoing description of the embodiment of the present invention, it is assumed that the address translation table is contained in the virtual data set (VDS) held in the external storage. It should however be understood that the processing can also be performed without holding the address translation table in the magnetic tape unit when the latter is used as the external storage. Since the magnetic tape unit allows only a sequential processing, being different from the magnetic disk unit, it is possible to prepare the address translation table at the time when data is read. In that case, it is conceivable to incorporate the address translation table generating firmware in the virtual channel subsystem (VCS) 5 for generating the address translation table in the real storage by the abovementioned firmware when the virtual data set (VDS) is opened. As another method, the virtual channel subsystem (VCS) 5 may generate the page table in the real storage as one of the function VCS 5 upon actual page-in from the magnetic tape unit to the real storage. Considering, by way of example, the virtual magnetic tape unit (VMT) 9 shown in FIG. 16, the page table (PTV) for the pages "1" to "i+1" is prepared when the virtual data set (VDS) is opened since the processing is sequentially performed from the page "1" in the case of the virtual magnetic tape unit (VMT). Upon completion of processing of the first block, the page table PTV for the pages "1" to "i" is indicated as being valid, while the PTV for the page "i+1" is indicated as being invalid. Accordingly, when the request for the page "i+1" is issued, a page fault takes place. Thus, at this time point, the page table (PTV) up to the page "2i+1" is prepared, followed by the processing for the second block. At any rate, the whole page table PTV need not be prepared from the beginning, because the processing is performed sequentially.

The computer system according to the illustrated embodiment of the invention brings about advantageous effects mentioned below.

(1) By virtue of provision of the virtual channel subsystem in the computer system, relevant hardware units (firmwares) can automatically perform the duplicate file write processing, file copy processing and other processing with the aid of the cache command unit of the virtual channel subsystem, whereby the load on the software can be significantly reduced.

(2) Owing to the virtual magnetic tape unit as provided, the magnetic tape unit can be handled as the virtual data set space on the extended virtual storage (i.e. spool function can be extended to the magnetic tape unit), whereby the processing operation by program and the operation of the magnetic tape unit can be made asynchronous with each other.

(3) Since the channel program activating the magnetic tape unit is separated from software, the load on the input/output (I/O) supervisor can be reduced.

(4) Since the virtual magnetic tape unit can be used in place of the magnetic tape unit in the computer system, it is possible to space the magnetic tape unit itself from the computer system.

(5) Because the virtual magnetic tape unit can be used in place of the magnetic tape unit while the virtual disk unit can be used in place of the magnetic disk unit, it is possible to use the virtual tape unit or the virtual disk unit as the back-up unit when the magnetic disk unit or the magnetic tape unit is changed (moved) in the computer system.

(6) The virtual magnetic tape unit can be used as the back-up for the virtual disk unit.

I claim:

1. A computer system, comprising:
an external storage holding a virtual data set, which includes data or a program, and an address translation table;
processing means operatively connected to said external storage and including a real storage for holding a copy of said address translation table, said copy of said address translation table being transferred along with a copy of said virtual data set from said external storage, said processing means performs an accessing operation with an address obtained by using said copy of said address translation table held in said real storage to form a virtual data set space in said real storage;
wherein said processing means includes:
   (a) address translation means for performing address translation using said copy of said address translation table held in said real storage;
   (b) means for making access to said real storage using a real address which is translated form a virtual address of required data by said address translation means using said copy of said address translation table, when the required data is in said real storage; and
   (c) means for delivering said virtual address of the required data to said external storage to thereby read out the required data from said virtual data set of said external storage and for storing the data read out from said virtual data set of said external storage in said real storage while updating said copy of said address translation table, when the required data is absent from said real storage.

2. A computer system according to claim 1, further including channel means operatively connected to said processing means and said external storage for responding only to the virtual address of the required data issued by said processing means to store in said real storage required data read from said external storage while updating the copy of said address translation table in said real storage to indicate the address in said real storage where the required data has been stored.

3. A computer system, comprising:
an external storage holding a virtual data set, which includes data, a program and an address translation table;
processing means, operatively connected to said external storage and including a real storage for holding a copy of said address translation table, which is transferred from said external storage, for performing an accessing operation with an address obtained by using the copy of said address translation table held in said real storage;
wherein said processing means includes:
(a) address translation means for performing address translation using the copy of said address translation table held in said real storage;
(b) means for making access to said real storage using a real address which is translated from a virtual address of required data by said address translation means using the copy of said address translation table, when the required data is in said real storage; and
(c) means for delivering said virtual address of the required data to said external storage to thereby read out the required data from said external storage and for storing the data read out from said external storage and for storing the data read out from said external storage in said real storage, when the required data is absent from said real storage;
said real storage including a first real storage holding a first address translation table and a second real storage holding a second address translation table;
said address translation means including first address translation means for translating a virtual address to a real address in said first real storage by using said first address translation table and second address translation means for translating a virtual address to a real address in said second real storage by using said second address translation table; and
wherein said processing means stores the copy of said address translation table transferred from said external storage upon opening of said virtual data set in said second real storage as said second address translation table.

4. A compute system according to claim 3, wherein said first address translation means includes table means pointing to said second address translation table to thereby make access to said second real storage in accordance with a pointing of said means table when the required data is absent from said first real storage.

5. A computer system according to claim 3, further comprising a virtual channel subsystem for performing a transfer processing in response to a command for the transfer of the virtual data set between said external storage and said first real storage or said second real storage, said virtual channel subsystem including means for performing a second transfer processing in response to said command for said virtual data set in duplicate in correspondence with the first mentioned transfer processing from said virtual data set.

6. A computer system according to claim 5, wherein said virtual channel subsystem includes a channel program generating firmware for generating a channel program in response to said command, said generated channel program being executed for performing the transfer processing for the transfer of data between said first real storage and said second real storage.

7. A computer system according to claim 3, wherein said processing means is accessible to said first real storage operating as a virtual storage by utilizing said first address translation means, while being accessible to said second real storage operating as an extended virtual storage by utilizing said second address translation means, said processing means further including an extended dual address pace for coupling said second real storage and said first real storage to each other.

8. A computer system according to claim 3, wherein said external storage includes a magnetic disk unit operating as a virtual disk unit through use of a page table indicating a relation between a data set stored in said magnetic disk unit and a data set stored in said second real storage.

9. A computer system according to claim 8, wherein said external storage further includes a magnetic tape unit operating as a virtual magnetic tape unit by establishing a correspondence between the data set in the magnetic tape unit and the data set in said virtual data unit.

10. A computer system, comprising:
a magnetic tape unit for holding a virtual data set and an address translation table;
processing means including a real storage, holding a copy of said address translation table, and address translation means for translating addresses using said copy of said address translation table held in said real storage, said copy of said address translation table being transferred along with a copy of said virtual data set from said magnetic tape unit, said processing means including means for making access to said real storage using a real address obtained by translating a virtual address of required data to said real address by using said copy of said address translation table;
a channel connected to said processing means and said magnetic tape unit;
said processing means including means for supplying said virtual address to said channel when the required data is absent from said real storage and means for holding data transferred from said channel in response to said virtual address in said real storage; and
said channel including means for transferring said copy of said address translation table along with said copy of said virtual data set from said magnetic tape unit to said real storage in response to opening of a virtual data set space in said real storage or issuing a virtual address of required data from said processing means.

11. A computer system according to claim 1, wherein a copy of said address translation table is transferred from said external storage to said real storage when said virtual data set is opened.

12. A computer system according to claim 1, wherein said processing means further includes means for judging whether or not required data is in said real storage by referring to the copy of said address translation table.

13. A computer system according to claim 2, wherein said channel means generates a channel program for accessing said virtual data set held on said external storage in response to said virtual address of the data as required delivered from said processing means.

14. A method of accessing data in a virtual storage computer system having an external storage holding a virtual data set, which includes data or a program, and an address translation table, and a processor having a real storage for holding data or a program and a copy of said address translation table, the method comprising the steps of:
   (a) transferring the content of said address translation table along with a copy of said virtual data set from said external storage to said real storage, when access is to be made to said virtual data set to form a virtual data set space in said real storage;
   (b) translating a virtual address of required data to real address using the content of said address translation table transferred to said real storage;
   (c) accessing said real storage using said real address to obtain said required data;
   (d) detecting when required data which is accessed in step (c) is not present in said real storage; and
   (e) delivering said virtual address of said required data to said external storage to access said required data therein when said required data is not present in said real storage.

15. A method of accessing data according to claim 14, further including:
   (f) transferring said required data from said external storage to a storage location in said real storage when said virtual address is delivered to said external storage; and
   updating the address translation table transferred to said real storage to indicate the address of the storage location in said real storage where the required data is stored.

16. A method of accessing data in a virtual storage computer system having a magnetic tape unit holding a virtual data set and an address translation table, a processor having a real storage and a channel connected between said processor and said magnetic tape unit, the method comprising the steps of:
   (a) transferring a copy of said address translation table along with a copy of said virtual data set from said magnetic tape unit to said real storage in response to an opening of a virtual data set space in said real storage under control of said channel;
   (b) translating a virtual address of required data to a real address under control of said processor using said copy of said address translation table transferred to said real storage;
   (c) accessing said real storage using said real address to obtain said required data when said required data is held in said real storage;
   (d) supplying said virtual address of said required data to said channel to access said required data in said magnet tape unit under control of said channel when said required data is absent from said real storage; and
   (e) transferring said required data from said magnetic tape unit to said real storage under control of said channel while updating said copy of said address translation table when said required data is absent from said real storage.

17. A method of accessing data according to claim 16, further comprising a step of:
   judging whether or not required data is in said real storage by referring to said copy of said address translation table held in said real storage.

* * * * *